(12) United States Patent
Armand et al.

(10) Patent No.: US 7,457,018 B2
(45) Date of Patent: *Nov. 25, 2008

(54) SYNTHESIS METHOD FOR CARBON MATERIAL BASED ON LIMPO$_4$

(75) Inventors: Michel Armand, Montreal (CA);
Michel Gauthier, La Prairie (CA);
Jean-Francois Magnan, Neuville (CA);
Nathalie Ravet, Montreal (CA)

(73) Assignee: Hydro-Quebec, Montreal, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/655,084

(22) Filed: Jan. 19, 2007

(65) Prior Publication Data

US 2007/0134554 A1  Jun. 14, 2007

Related U.S. Application Data

(63) Continuation of application No. 10/362,764, filed on Jun. 19, 2003, now Pat. No. 7,285,260.

(30) Foreign Application Priority Data

| Sep. 26, 2000 | (CA) | ................................. 2320661 |
| Sep. 21, 2001 | (WO) | ..................... PCT/CA01/01350 |

(51) Int. Cl.
*B32B 9/00* (2006.01)
*G02F 1/00* (2006.01)
*H01G 4/008* (2006.01)
*H01M 4/58* (2006.01)

(52) U.S. Cl. ......................... 359/32; 361/305; 428/402; 428/403; 429/218.1; 429/221; 429/229; 429/231.6; 429/231.95

(58) Field of Classification Search ................ 428/402, 428/403; 359/321; 361/305; 429/218.1, 429/221, 229, 231.6, 231.95
See application file for complete search history.

(56) References Cited

U.S. PATENT DOCUMENTS 4,009,092 A  2/1977  Taylor (Continued)

FOREIGN PATENT DOCUMENTS

| CA | 2270771 | 4/1999 |
| CA | 2307119 | 4/2000 |
| EP | 0 630 064 | 12/1994 |
| EP | 1 049 182 | 11/2000 |
| EP | 1 094 532 | 4/2001 |
| EP | 1 094 533 | 4/2001 |
| WO | 01/53 198 | 7/2001 |

OTHER PUBLICATIONS

Andersson, A.S. et al., "Thermal Stability of LiFePO$_4$-Based Cathodes", Electrochem and Solid-State Letters, 3 (2) 66-68 (2000), The Electrochemical Society, Inc., no month.

(Continued)

*Primary Examiner*—Wayne Langel
(74) *Attorney, Agent, or Firm*—Buchanan Ingersoll & Rooney PC

(57) ABSTRACT

Method of synthesis for a material made of particles having a core and a coating and/or being connected to each other by carbon cross-linking, the core of these particles containing at least one compound of formula $Li_xM_{1-y}M'_y(XO_4)_n$, in which x, y and n are numbers such as $0 \leq x \leq 2$, $0 \leq y \leq 0.6$ and $1 \leq n \leq 1.5$, M is a transition metal, M' is an element with fixed valency, and the synthesis is carried out by reaction and bringing into equilibrium the mixture of precursors, with a reducing gaseous atmosphere, in such a way as to bring the transition metal or metals to the desired valency level, the synthesis being carried out in the presence of a source of carbon called carbon conductor, which is subjected to pyrolysis. The materials obtained have excellent electrical conductivity, as well as very improved chemical activity.

34 Claims, 11 Drawing Sheets

U.S. PATENT DOCUMENTS

| | | |
|---|---|---|
| 5,871,866 A | 2/1999 | Barker et al. |
| 5,910,382 A | 6/1999 | Goodenough et al. |
| 5,958,624 A | 9/1999 | Frech et al. |
| 6,254,844 B1 | 7/2001 | Takeuchi et al. |
| 6,319,632 B1 | 11/2001 | Amine |
| 6,387,568 B1 | 5/2002 | Barker et al. |
| 6,528,033 B1 | 3/2003 | Barker et al. |
| 2002/0195591 A1 | 12/2002 | Ravet et al. |

OTHER PUBLICATIONS

Ravet, N., et al., "Electroactivity of Natural and Synthetic Triphylite", Proceedings of the 10th IMLB, Como, Italy, May (2000).

Yamada, A. et al., "Optimized $LiFePO_4$ for Lithium Battery Cathodes", J. Electrochem Soc. 148 (3) A224-A229 (2001), The Electrochemical Society, Inc., no month.

Scrosati, B., "Rechargeable Lithium Cells", Modem Batteries, 199-242 (1997) de C.A. Vincent & B. Scrosati publishers, London, Sydney, Auckland (1997), no month.

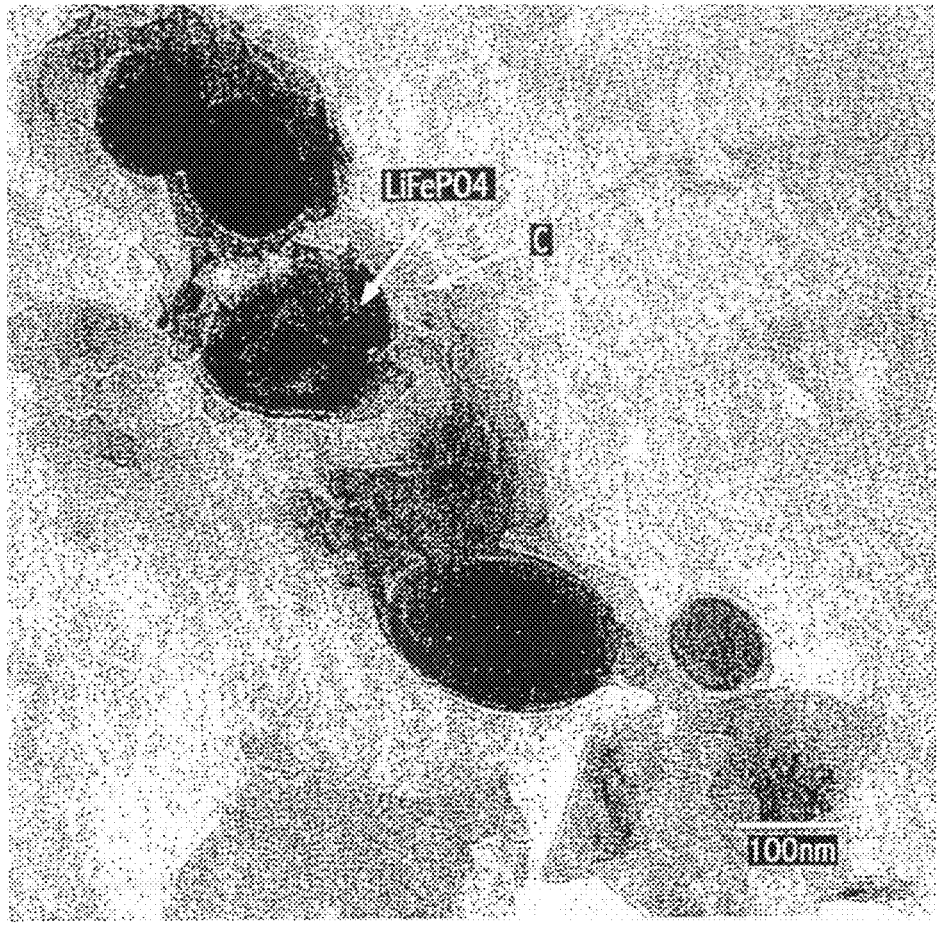
FIGURE 11. Transmission electron microscope micrograph showing the coating and the cross-linking with carbon of the particles of LiFePO$_4$.

SYNTHESIS METHOD FOR CARBON MATERIAL BASED ON LIMPO₄

RELATED APPLICATION DATA

This application is a continuation of application Ser. No. 10/362,764, filed Jun. 19, 2003, now U.S. Pat. No. 7,285,260 which is a § 371 national stage application of International Application No. PCT/CA01/01350, filed Sep. 21, 2001, and claims priority to Canadian Application No. 2,320,661, filed Sep. 26, 2000.

FIELD OF THE INVENTION

The present invention relates to a method for preparing electrode materials that are able to make possible redox reactions by exchange of alkaline ions and electrons. The applications are in the area of primary or secondary electrochemical generators (batteries), supercapacity generators and in the area of modulation systems for electrochromic light.

PRIOR ART

Insertion compounds of the formula LiMPO$_4$ with olivine structure, where M is a metallic cation belonging to the first period [of the periodic table] of transition metals, e.g. Mn, Fe, Co or Ni, are known and their use as cathode material in lithium batteries has been reported by Goodenough et al. in the patent U.S. Pat. No. 5,910,382. In the Canadian patent application with the number CA-A-2,307,119, the general nature of the "LiMPO$_4$ type" compounds was indicated insofar as, while essentially maintaining the same olivine structure, part of the M atoms may be substituted with other metals with valency between 2 and 3, in which the adjacent transition elements, or a part of the phosphorus, can be substituted by elements such as Si, S, Al, As. Similarly, the lithium that allows electroneutrality can occupy a fraction or all of the octahedral sites of the olivine structure, or possibly position itself in an interstitial position when all of the octahedral sites are occupied.

The formula

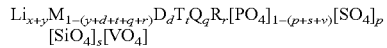

$$Li_{x+y}M_{1-(y+d+t+q+r)}D_dT_tQ_qR_r[PO_4]_{1-(p+s+v)}[SO_4]_p[SiO_4]_s[VO_4]_v$$

in which:

M can be Fe$^{2+}$ or Mn$^{2+}$ or a mixture of the two;

D can be a metal in the +2 oxidation state chosen from the group containing Mg$^{2+}$, Ni$^{2+}$, Co$^{2+}$, Zn$^{2+}$, Cu$^{2+}$ and Ti$^{2+}$;

T can be a metal in the +3 oxidation state chosen from the group containing Al$^{3+}$, Ti$^{3+}$, Cr$^{3+}$, Fe$^{3+}$, Mn$^{3+}$, Ga$^{3+}$ and V$^{3+}$;

Q is a metal in the +4 oxidation state chosen from the group containing Ti$^{4+}$, Ge$^{4+}$, Sn$^{4+}$ and V$^{4+}$; and R is a metal in the +5 oxidation state chosen from the group containing V$^{5+}$, Nb$^{5+}$ and Ta$^{5+}$, with a definition of the values taken by parameters x, y, d, t, q, r, p, s and v, encompasses the general nature of the meaning given to the term "of the Li$_x$MXO$_4$ type, 0≦x≦2" with olivine structure in the meaning of the present invention and will be used in the following. The preferred substituents for the phosphorus are silicon and sulfur.

In these compounds prepared in the lithiated form (in discharged state), at least one of the transition metals is in oxidation state II. In the patent U.S. Pat. No. 5,910,382 and its CIP, as well as in the following patents and publications, the syntheses of the LiMPO$_4$ compounds are all carried out using a salt of the transition metal M corresponding to oxidation state II and maintaining this oxidation state throughout the synthesis, up to the final product. The transition element, for which the valency II is maintained throughout the course of synthesis, no matter what method is used, is iron, with the majority of its compounds oxidizing spontaneously. For example, in air, LiFePO$_4$ has been produced by reaction in the solid state, at high temperature and under inert atmosphere, of various constituents (e.g. for the iron source Fe(OOCCH$_3$)$_2$, for the phosphate source, NH$_4$H$_2$PO$_4$ and for that of lithium, Li$_2$CO$_3$). In all these cases, the iron source is a salt in which the iron is in oxidation state II, which could be using iron (II) acetate as described in the patent U.S. Pat. No. 5,910,382, iron (II) oxalate as described in Electrochem and Solid-State Letters, 3, 66 (2000) and in the Proceedings of the 10th IMLB, Como, Italy, May (2000) or vivianite (Fe$_3$(PO$_4$)$_2$ 8H$_2$O) as described in the Canadian patent application CA-A-2,270,771. The sensitivity of iron (II) with respect to oxidation by oxygen makes all of these synthesis processes very delicate and all possible precautions must be taken to completely exclude the presence of oxygen, and in particular at the time of thermal processing, which increases the cost of the material accordingly. This sensitivity gives rise to a lack of reproducibility of the electrochemical behavior of the samples. This problem is emphasized in Yamada et al., J. Electrochem Soc., 148, A224 (2001). In addition, iron is the most useful element which, due to its abundance and lack of toxicity, and the principle used in the invention, is intended for an improved preparation of redox compounds containing this element. It is obvious that the results of the invention apply to manganese, vanadium, cobalt, titanium, vanadium, etc. under corresponding conditions, at their desired degree of oxidation. In a general way, the precursor of the metal M that is less costly or easier to manipulate does not correspond to the same state of oxidation as that required in the redox material formula.

An improvement in these compounds has previously been suggested in the Canadian patent CA-A-2,270,771. In this document, it has been shown that the electrochemical performance of LiFePO$_4$ was greatly improved, no matter whether in terms of reversible capacity, cyclability or power, when the particles of the material are covered with a fine layer of electronically conductive carbon. In this application, the inventors have benefited from using an iron salt at oxidation state II, in the presence of an organic compound that can be pyrolyzed under the synthesis conditions without it being possible for the carbon residue to become oxidized due to the low oxidizing power of the ferrous compound or of the atmosphere in equilibrium with it.

The patent application EP-A-1,094,532 describes a production method for materials for an active positive electrode. This method includes a step where a number of substances are mixed to obtain a precursor. Then the precursor is sintered to result in the synthesis of a compound of the formula Li$_x$M$_y$PO$_4$, in which x is greater than 0 and less than or equal to 2, y is greater than or equal to 0.8 and less than or equal to 1.2 and M includes at least one metal having 3d orbitals. A solid reducing agent is added in the course of the mixing step of the precursor in order to allow the preparation, which is carried out under inert atmosphere, of material for active positive electrodes that are capable of doping and dedoping lithium in a satisfactory and reversible manner.

EP-A-1,094,533 describes a non-aqueous electrolyte adapted for secondary batteries using a material or an active electrode containing a compound represented by the general formula Li$_x$M$_y$PO$_4$, in which x is greater than 0 and less than or equal to 2, and y is greater than or equal to 0.8 and less than or equal to 1.2, with M containing a 3d transition state, and the grains of $Li_xM_yPO_4$ are no greater in size than 10 micrometers. This non-aqueous electrolyte for secondary batteries is presented as having improved cyclic characteristics and a high capacity.

The international PCT application, reference number WO 01/53198, describes a material based on a mixed lithium metal compound that releases lithium ions by electrochemical interaction. This material is prepared using the necessary precursors by reduction of at least one of the metallic ions by carbon.

Besides their electrochemical performance in lithium batteries, the interest in this new family of materials is to make use of elements that are non-toxic, abundant and inexpensive to extract. These characteristics are critical to the development of large lithium batteries that can be used, in particular, in the electric vehicle market where a pressing need has developed in view of the accumulation of greenhouse gases in the environment.

Thus there is the need to develop a new procedure that is simpler and more reproducible, and less difficult than those that are already known while still offering improved performance.

SUMMARY OF THE INVENTION

The present invention describes a synthesis procedure for compounds of the formula $Li_xM_{1-y}M'_y(XO_4)_n$, by bringing into equilibrium, in the required proportions, a mixture containing precursors of the constituents of the compound, and reduction of the equilibrated mixture of the precursors with a reducing gas atmosphere. The initial mixture can be supplemented with a source of carbon, which makes possible the preparation of compounds of the formula $Li_xM_{1-y}M'_y(XO_4)_n$ in the form of a material made up of carbon-coated grains. The material thus obtained has excellent conductivity.

These materials can especially be used for the preparation of electrochemical cells having an electrolyte and at least two electrodes, of which at least one comprises at least one material synthesized according to one of the procedures according to the invention.

BRIEF DESCRIPTION OF THE DRAWINGS

Legends for the Figures Cited in the Examples

FIG. 11: Transmission electron microscope micrograph showing the coating and the cross-linking with carbon of the particles of LiFePO$_4$.

DESCRIPTION OF THE INVENTION

Figure 1:
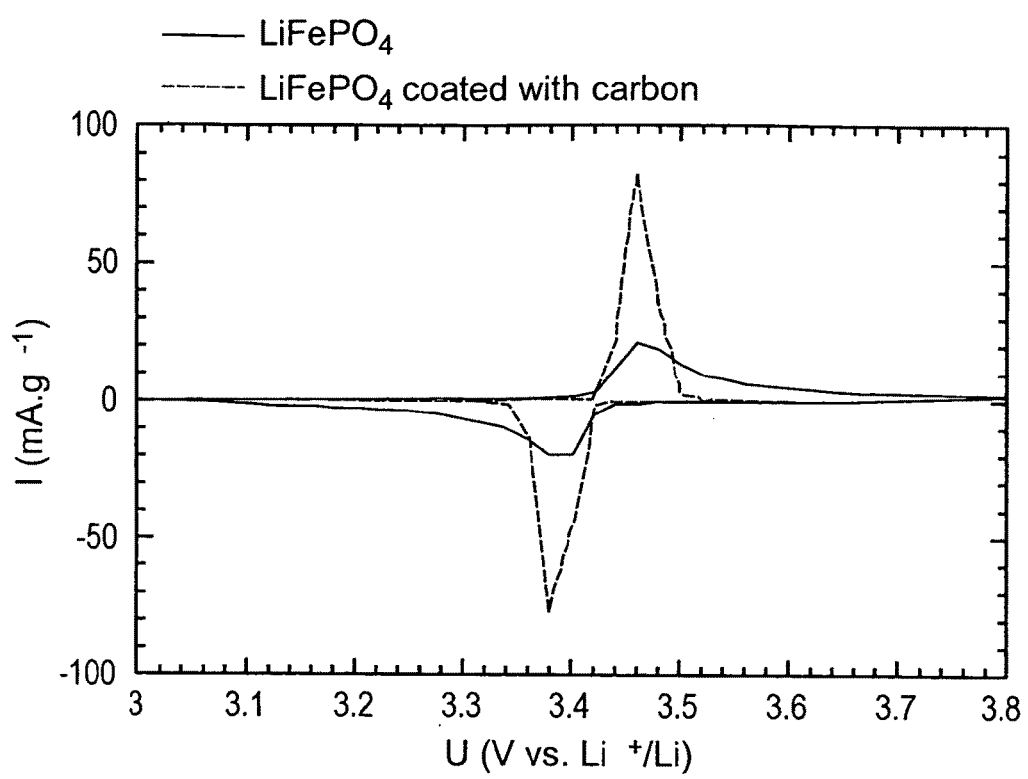
FIG. 1: $1^{st}$ cycle obtained by slow voltametry ($v=20$ mV.h$^{-1}$) at 80° C. for a battery containing non-carbonated LiFePO$_4$, synthesized using FePO$_4$.2H$_2$O (reduction by hydrogen) (solid lines) compared to the same sample after carbonating (dotted lines).

A first object of the present invention consists of the synthesis of compounds of the formula $Li_xM_{1-y}M'_y(XO_4)_n$, in which x, y and n are numbers such as $0 \leq x \leq 2$, $0 \leq y \leq 0.6$, and $1 \leq n \leq 1.5$, M is a transition metal or a mixture of transition metals from the first line of the periodic table, M' is an element with fixed valence chosen among $Mg^{2+}$, $Ca^{2+}$, $Al^{3+}$, $Zn^{2+}$ or a combination of these same elements and X is chosen among S, P and Si, by bringing into equilibrium, in the required proportions, a mixture containing at least:
  a) a source of M, at least one part of the said transition metal or metals making up M being in an oxidation state greater than that of the metal in the final compound $Li_xM_{1-y}M'_y(XO_4)_n$;
  b) a source of an element M';
  c) a compound that is a source of lithium; and
  d) possibly a compound that is a source of X,
the sources of the elements M, M', Li and X being introduced or not, in whole or in part, in the form of compounds having more than one source element, and
the synthesis being carried out by reaction and bringing into equilibrium, in the proportions required, the mixture (preferably intimate and/or homogeneous mixture) of the precursors a) to d) and by reduction in such a way as to bring the transition metal or metals to the desired degree of valency.

The reduction may be carried out in different ways, by the techniques used in the production of ceramics and by different reducing agents, based on the chemistry of carbon derivatives, among them CO, hydrocarbons and various organic compounds, hydrogen and ammonia.

According to a preferred embodiment of the present invention, the reduction of the mixture of precursors a) to d) is carried out with a reducing gaseous atmosphere.

The source of M can also be the source of X and/or the source of M' can also be the source of X and/or the source of lithium can also be the source of X and/or the source of X can also be the source of lithium.

According to a preferred embodiment of the invention, bringing the mixture of precursors a) to d) into equilibrium is carried out in the form of an intimate and/or homogeneous mixture. In the meaning of the present invention, intimate mixture is preferably understood as a mixture that does not contain aggregates of particles of individual components of the mixture and that has particle sizes preferably less than 10 micrometers, preferably less than 5 micrometers. The methods that make this implementation possible are known to the person skilled in the art, such as co-grinding in the presence of balls of hard material (such as steel, tungsten carbide, aluminum, zirconium), dry or in the presence of a liquid, i.e. with equipment of the cyclone type where the particles are ground by striking against the walls of the equipment or against itself, ultrasonic energy, or even spray drying of solutions or suspensions.

Homogeneous mixture is understood as a mixture in which no local variation in concentration of one of the components of the mixture is evident from which the fraction of the mixture chosen for sampling would be extracted. Mechanical agitation by the slanting of blades or of magnetic stirring bars for suspensions, planetary mixers with cycloid movement are examples of the methods used; by definition the solutions respond to this criterion.

In the scope of the present invention, the transition metal or metals is (are) advantageously chosen at least partially in the group constituted by iron, manganese, cobalt and nickel, the remainder of the transition metals preferably being chosen in the group constituted by vanadium, titanium, chromium and copper.

Advantageously, the compound that is the source of M is in an oxidation state that can vary from 3 to 7.

According to a preferred embodiment of the invention, the source compound of M is iron (III) oxide or magnetite, manganese dioxide, di-vanadium pentoxide, trivalent iron phosphate, trivalent iron nitrate, trivalent iron sulfate, iron hydroxyphosphate and lithium hydroxyphosphate or trivalent iron sulfate or nitrate or a mixture of the latter.

According to another preferred embodiment of the procedure, the compound that is the source of lithium is chosen from the group constituted by lithium oxide or lithium hydroxide, lithium carbonate, the neutral phosphate $Li_3PO_4$, the acid phosphate $LiH_2PO_4$, the orthosilicates, the metasilicates or the polysilicates of lithium, lithium sulfate, lithium oxalate and lithium acetate or a mixture of the latter; still more preferably, the compound that is the source of lithium is lithium carbonate of the formula $Li_2CO_3$.

According to another advantageous method, the source of X is selected in the group constituted by sulfuric acid, lithium sulfate, phosphoric acid and its esters, the neutral phosphate $Li_3PO_4$ or the acid phosphate $LiH_2PO_4$, the monoammonium or diammonium phosphates, trivalent iron phosphate, manganese and ammonium phosphate ($NH_4MnPO_4$), silica, lithium silicates, alkoxysilanes and their partial hydrolysis products and mixtures of the latter. Still more advantageously, the compound that is the precursor of X is iron phosphate, preferably iron (III) phosphate, anhydrous or hydrated.

The procedure according to the invention works particularly well for the preparation of one or more of the following compounds, in which at least one of the lithium derivatives obtained has the formula $LiFePO_4$, $LiFe_{1-s}Mn_sPO_4$ wherein $0 \leq s \leq 0.9$, $LiFe_{1-y}Mg_yPO_4$ and $LiFe_{1-y}Ca_yPO_4$ wherein $0 \leq y \leq 0.3$, $LiFe_{1-s-y}Mn_sMg_yPO_4$ wherein $0 \leq s \leq 1$ and $0 \leq y \leq 0.2$, $Li_{1+x}FeP_{1-x}Si_xO_4$ wherein $0 \leq x \leq 0.9$, $Li_{1+x}Fe_{1-s}Mn_sP_{1-x}Si_xO$ wherein $0 \leq s \leq 1$, $Li_{1+z}Fe_{1-s-z}Mn_sP_{1-z}S_zO_4$ wherein $0 \leq s \leq 1$, $0 \leq z \leq 0.2$, $Li_{1+2q}Fe_{1-s-q}Mn_sPO_4$ wherein $0 \leq s \leq 1$, and $0 \leq q \leq 0.3$, $Li_{1+r}Fe_{1-s}Mn_s(S_{1-r}P_rO_4)_{1.5}$ wherein $0 \leq r \leq 1$, $0 \leq s,t \leq 1$ or $Li_{0.5+u}Fe_{1-t}Ti_t(PO_4)_{1.5}$ wherein $0 \leq t \leq 1$, $0 \leq u \leq 2.5$. The method according to the invention yields improved results when compounds of the formula $Li_xM_{1-y}M'_y(XO_4)_n$ are obtained that have an olivine or Nasicon structure, including the monoclinic form.

The reduction is obtained by the action of a reducing atmosphere chosen in such a way as to reduce the oxidation state of the metallic ion M to the level required for the composition of the compound without, however, reducing it to the neutral metallic state. This reducing atmosphere preferably contains hydrogen or a gas that is capable of generating hydrogen under the synthesis conditions, ammonia or a substance capable of generating ammonia under the synthesis conditions or carbon monoxide, these gases being used in their pure state or in mixtures and it also being possible to use them in the presence of water vapor and/or in the presence of carbon dioxide and/or in the presence of a neutral gas (such as nitrogen or argon).

According to an advantageous embodiment, the reducing atmosphere is made of a mixture of $CO/CO_2$ or $H_2/H_2O$, $NH_3/H_2O$ or a mixture of them, generating an oxygen equilibrium pressure less than or equal to that determined by the transition metal at the state of oxidation corresponding to the precursors introduced to form the compound $Li_xM_{1-y}M'_y(XO_4)_n$, but greater than that corresponding to the reduction of any one of the transition elements present to the metallic state, insuring the thermodynamic stability of $Li_xM_{1-y}M'_y(XO_4)_n$, in the reaction mixture, independent of the synthesis reaction time.

According to another advantageous embodiment of the invention, the reducing atmosphere is made of a mixture of $CO/CO_2$, $H_2/H_2O$, $NH_3/H_2O$ or a mixture of them, generating an oxygen equilibrium pressure less than or equal to that determined by one of the transition metals present in $Li_xM_{1-y}M'_y(XO_4)_n$, possibly being able to lead to the reduction of at least this transition element to the metallic state, the compound $Li_xM_{1-y}M'_y(XO_4)_n$, being obtained by controlling the temperature and the contact time with the gaseous phase; the synthesis temperature preferably being between 200 and 1200° C., still more preferably between 500 and 800° C. and the time of contact between the reaction mixture and the gaseous phase preferably being between 2 minutes and 5 hours and still more preferably between 10 and 60 minutes. This control is implemented more easily at the time of reduction by a gaseous phase due to the rapid diffusion of the gas molecules around the grains. In addition, the nucleation of the metallic phase is slow and thus can be more easily avoided due to the rapid reduction by the gaseous phase.

The gaseous reducing atmosphere is preferably obtained by decomposition, in a vacuum or in an inert atmosphere, of an organic compound or of a mixture of organic compounds containing at least hydrogen and oxygen, bound chemically, and pyrolysis of which generates carbon monoxide and/or a mixture of carbon dioxide and monoxide, of hydrogen and/or a mixture of hydrogen and water vapor that is able to carry out the reduction that leads to the formation of the compound $Li_xM_{1-y}M'_y(XO_4)_n$.

The reducing gas atmosphere is preferably obtained by partial oxidation by oxygen or by air, of a hydrocarbon and/or carbon called sacrificial carbon.

Preferably, sacrificial carbon is understood as carbon that is intended to carry out a chemical reaction, in particular with the gaseous phase, which in fact serves as a vector for reduction of precursors of the material, the carbon thus being intended to be consumed.

In the scope of the present invention, the amount of water vapor preferably corresponds to between 0.1 and 10 molecules, inclusively, of $H_2O$ per atom of hydrocarbon at an elevated temperature (preferably comprised between 400 and 1200° C.) that makes possible the formation of carbon monoxide or hydrogen or a mixture of carbon monoxide and hydrogen.

According to an advantageous method, the sacrificial carbon is chosen from the group constituted by natural or artificial graphite, carbon black or acetylene black and coke (preferably from petroleum), the sacrificial carbon preferably being in the form of particles with a size that is preferably less than 15 micrometers, and still more preferably less than 2 micrometers.

The quantity of sacrificial carbon is preferably less than or essentially equal to the quantity required to reduce the reaction mixture without allowing residual sacrificial carbon; this quantity is preferably a carbon atom that is able to combine with an oxygen atom at temperatures greater than 750° C. and it is preferably an atom that can combine with 2 oxygen atoms at temperatures less than 750° C.

According to another advantageous embodiment, the synthesis is carried out with a quantity of sacrificial carbon that is (essentially) equal, mol for mol, to half the quantity of oxygen needed to be removed from the mixture of the precursor compounds to obtain the material $Li_xM_{1-y}M'_y(XO_4)_n$ by reduction, when the reaction is carried out below 710° C. and equal, mol for mol, to this quantity when the reaction is carried out below this temperature.

A second object of the present invention is a method of synthesis for a material comprising a core and a coating and/or being connected to each other by cross-linking, the said core comprising at least one compound of the formula $Li_xM_{1-y}M'_y(XO_4)_n$, in which x, y and n are numbers such as $0 \leq x \leq 2$, $0 \leq y \leq 0.6$, and $1 \leq n \leq 1.5$, M is a transition metal or a mixture of transition metals from the first period of the periodic table, M' is an element with fixed valency chosen from among $Mg^{2+}$, $Ca^{2+}$, $Al^{3+}$, $Zn^{2+}$ and X is chosen from among S, P and Si, and the said coating is made of a layer of carbon, the said cross-linking is made of carbon (connecting at least two particles to each other), the said method consists of bringing into equilibrium (preferably intimate and/or homogeneous), in the proportions required, a mixture containing at least a) a source of M, at least one part of the said transition metal or metals making up M being in an oxidation state greater than that of the metal in the final compound $Li_xM_{1-y}M'_y(XO_4)_n$;

b) a source of an element M';

c) a compound that is a source of lithium; and d) possibly a compound that is a source of X;

the sources of the elements M, M', Li and X being introduced or not, in whole or in part, in the form of compounds having more than one source element, and the synthesis being carried out by reaction and bringing into equilibrium, in the proportions required, the mixture of the precursors a) to d) with a reducing gaseous atmosphere, in such a way as to bring the transition metal or metals to the desired degree of valency, the synthesis being carried out in the presence of a carbon source called carbon conductor, the synthesis thus leading to the said material, by a pyrolysis step for the carbon source compound after, or preferably simultaneously with, the steps of preparation of the mixture (preferably intimate and/or homogeneous) of the precursors and reduction of the mixture obtained.

The carbon present in the material, in the form of coating and cross-linking, adheres intimately to the material and lends to the latter an electronic conductivity that is greater than that of the material constituted by the corresponding non-coated particles.

According to a preferred method, the addition of carbon conductor is carried out after the synthesis of the $Li_xM_{1-y}M'_y(XO_4)_n$.

According to another advantageous embodiment of the invention, the addition of carbon conductor is carried out simultaneously with the synthesis of the $Li_xM_{1-y}M'_y(XO_4)_n$.

The reaction parameters, in particular the kinetics of the reduction by the gaseous phase, are chosen in such a way that the carbon conductor does not participate in a significant way in the reduction process.

According to another important variation, the reaction parameters of the synthesis, such as flow and composition of the gaseous phase, temperature and contact time, are chosen in such a way that the carbon conductor does not participate in a significant way in the reduction process, i.e. the reduction process is due to the gaseous phase, and in particular in such a way that the reaction temperature is preferably less than 900° C. and the reaction time less than 5 hours, in a manner that is even more advantageous if the reaction temperature is below 800° C. and/or for a time less than 1 hour.

According to another variation of the synthesis, the value of x in $Li_xM_{1-y}M'_y(XO_4)_n$ is chosen in such a way as to insure thermodynamic control and/or rapid kinetics of the reduction by making it possible to select reducing gaseous atmospheres that are easily accessible by simple mixture of gases or by reforming simple organic molecules.

The organic substance that is the source of carbon conductor is selected in such a way that the particles of material obtained after the pyrolysis step essentially have the form and granulometric distribution of the precursors of the synthesis reaction.

Thus, the organic substance that is the source of the carbon conductor is advantageously selected from the group constituted by polymers and oligomers containing a carbon skeleton, simple carbohydrates or polymers and the aromatic hydrocarbons.

The organic substance that is the source of carbon conductor is chosen in such a way as to leave a deposit of carbon conductor on the surface (coating) of the solid particles that are made up of the material and/or between these solid particles making up the carbon bridges (cross-linking) at the time of pyrolysis.

According to another variation, the carbon conductor source contains, in the same compound or in the mixture that constitutes this source, oxygen and hydrogen that are bound chemically and from which pyrolysis locally releases carbon monoxide and/or carbon dioxide and/or hydrogen and water vapor that contributes, in addition to depositing carbon, to creating locally the reducing atmosphere required for synthesis of the material $Li_xM_{1-y}M'_y(XO_4)_n$.

Thus, the organic substance that is the source of carbon conductor source is at least one of the compounds of the group constituted by polyethylene, polypropylene, glucose, fructose, sucrose, xylose, sorbose, starch, cellulose and its esters, block polymers of ethylene and ethylene oxide and polymers of furfuryl alcohol.

The source of carbon conductor is preferably added at the start of, or in the course of, the mixing step of the reaction precursors a) to d).

According to a preferred method, the amount of substance that is the carbon conductor source, present in the reaction medium subjected to reduction, is chosen such that the amount of carbon conductor in the reaction mixture is preferably comprised between 0.1 and 25%, inclusively, and still more preferably comprised between 0.3 and 1.5%, inclusively, of the total mass of the reaction mixture.

Advantageously, in the method according to the first object of the invention, as well as in the method according to the second object of the present invention, the thermal processing (which includes the formation reaction of $Li_xM_{1-y}M'_y(XO_4)_n$ and the reduction and pyrolysis) is carried out by heating from normal temperature to a temperature comprised between 500 and 1100° C. in the presence of a reducing atmosphere such as defined above. This maximum temperature reached is even more advantageously comprised between 500 and 800° C.

According to another advantageous embodiment, the temperature and duration of the synthesis are chosen as a function of the nature of the transition metal, i.e. above a minimum temperature at which the reactive atmosphere is capable of reducing the transition element or elements to their oxidation state required in the compound $Li_xM_{1-y}M'_y(XO_4)_n$ and below a temperature or a time leading to a reduction of the transition element or elements to the metallic state or am oxidation of the carbon resulting from pyrolysis of the organic substance.

According to another advantageous embodiment of the procedure according to the second object of the present invention, the heart of the core of the particles of the core synthesized is at least 95% an $Li_xM_{1-y}M'_y(XO_4)_n$ compound (preferably the compound synthesized has the formula $LiMPO_4$), the remainder may be an oxide of one or [more] of the metals of the precursors, functioning as an insertion or inert compound, carbon, carbonate or lithium phosphate and the amount of carbon conductor after pyrolysis is comprised between 0.1 and 10% by mass in comparison to the mass of the compound $LiMPO_4$.

The compound that is the source of carbon conductor is advantageously chosen such that it is easily dispersible at the time of mixture with the precursors. The intimate and/or homogeneous mixture of precursors a) to d) is advantageously produced by agitation and/or by mechanical grindings and/or by ultrasonic homogenizing, in the presence, or not, of a liquid or by spray-drying of a solution of one or more precursors and/or of a suspension and/or of an emulsion.

According to a particularly advantageous embodiment, the synthesis according to the present invention comprise the two steps:
 i) intimate grinding, dry or in a solvent, of the source compounds including carbon, and drying if necessary; and
 ii) thermal processing with scavenging by a controlled reducing atmosphere.

The procedures according to the invention make it possible to carry out the synthesis of materials having a conductivity that is greater than $10^{-8}$ Scm$^{-1}$, measured on a sample of powder compacted at a pressure greater than or equal to 3000, preferably 3750 Kg.cm$^{-2}$.

The conductivity measurement is carried out on powders of the sample. This powder (from 100 mg to around 1 g) is placed in a hollows cylindrical mold, 1.3 cm in diameter, made of poly(oxymethylene) (Delrin®) and it is compacted between two stainless steel pistons with a laboratory press having a force of $5.10^3$ Kg, which corresponds to a pressure of 3750 Kg.cm$^{-2}$.

The conductivity measurement is carried out by using the pistons (plungers) as electrodes and using the complex impedance method known to the person skilled in the art. The conductivity is obtained from the resistance, using the formula $\rho=RS/l$ where R is the measured resistance, S is the surface (1.33 cm$^2$ for 1.3 cm diameter), l is the thickness of the sample and the resistivity is determined using the formula $\rho=RS/l$.

One of the compounds advantageously prepared by the procedure according to the first object of the present invention is the compound of formula $LiFePO_4$.

One of the materials advantageously obtained by the synthesis procedure according to the second object of the present invention is made up of particles having a core, a coating and/or a cross-linking. The core of the particles is essentially (preferably at least 95%) made up of a compound of formula $LiFePO_4$, the remainder being made up of other compounds, in particular other oxides having an activity or not, or lithium phosphate or ferric phosphate and in which the coating and/or cross-linking of the particles of the material by carbon preferably represents an amount of carbon conductor between 0.2 and 5%, preferably between 0.3 and 3%, in comparison to the total mass of the material obtained.

The compound that is the source of iron, in particular the compound that is the source of iron in the synthesis of the compound of formula $LiFePO_4$, is chosen at least partially from the group constituted by iron phosphates, iron oxyphosphates or hydroxyphosphates, iron oxides and lithium oxides, in which at least a part of the iron is in the oxidation state III, as well as mixtures of the latter.

The compound that is the source of lithium is advantageously lithium phosphate, lithium dihydrogenophosphate, lithium carbonate, lithium acetate or lithium hydroxide, as well as mixtures of the latter.

The compound that is the source of phosphorus is advantageously ammonium phosphate, orthophosphoric, metaphosphoric or pyrophosphoric acid or phosphorus pentoxide.

The synthesis procedure according to the invention can be carried out in the reactor that is used, or was used, for the preparation of the mixture of precursors or in a different reactor (preferably in a reformer).

A third object of the present invention is made up by particles of a compound of formula $Li_xM_{1-y}M'_y(XO_4)_n$, in which x, y and n are numbers such as $0 \leq x \leq 2$, $0 \leq y \leq 0.6$, and $1 \leq n \leq 1.5$, M is a transition metal or a mixture of transition metals from the first line of the periodic table, M' is an element with fixed valency chosen from among, $Mg^{2+}$, $Ca^{2+}$, $Al^{3+}$, $Zn^{2+}$ and X is chosen from among S, P and Si, the said compound having a conductivity greater than $10^{-8}$ S.cm$^{-1}$, measured on a sample of powder compressed at a pressure of 7350 Kg.cm$^{-2}$, the particles having a size between 0.05 micrometers and 15 micrometers, preferably between 0.1 and 10 micrometers.

A fourth object of the present invention consists of a material that can be obtained by a procedure according to the second object of the present invention, comprising a core and a coating and/or a cross-linking, said material having a total carbon amount greater than 0.1%, preferably between 0.1 and 0.2%, of the total mass of the material.

According to an advantageous embodiment of this fourth object, the said core contains at least one compound of the formula $Li_xM_{1-y}M'_y(XO_4)_n$, in which x, y and n are numbers such as $0 \leq x \leq 2$, $0 \leq y \leq 0.6$, and $1 \leq n \leq 1.5$, M is a transition metal or a mixture of transition metals from the first line of the periodic table, M' is an element with fixed valency chosen from among $Mg^{2+}$, $Ca^{2+}$, $Al^{3+}$, $Zn^{2+}$ and X is chosen from among S, P and Si, the said material having a conductivity greater than $10^{-8}$ S.cm$^{-1}$, measured on a sample of powder compacted at a pressure of 3750 Kg.cm$^{-2}$.

A fifth object of the present invention consists of a material having a core and a coating and/or a cross-linking, the said core comprising at least one compound of formula Li$_x$M$_{1-y}$M'$_y$(XO$_4$)$_n$, in which x, y and n are numbers such as $0 \leq x \leq 2$, $0 \leq y \leq 0.6$, and $1 \leq n \leq 1.5$, M is a transition metal or a mixture of transition metals from the first line of the periodic table, M' is an element with fixed valency chosen in the group constituted by Mg$^{2+}$, Ca$^{2+}$, Al$^{3+}$, Zn$^{2+}$ and X is in the group constituted by S, P and Si, the said material having a conductivity greater than $10^{-8}$ S.cm$^{-1}$, measured on a sample of powder compacted at a pressure of 3750. The materials thus obtained have, according to the measurement method explained above, good conductivity that in some cases is greater than $10^{-8}$ Scm$^{-1}$ on a sample of compacted powder and one of carbon greater than 0.1%, preferably between 0.1 and 0.2%, of the total mass of the material.

The uses of these materials are very important in the area of electrochemistry, as electrode material, used alone or in a mixture with other electrically active materials, in particular in cells serving as primary or secondary generators, possibly connected in batteries or accumulators; in super-capacities, systems capable of storing electrical energy with significant power ($\geq 800$ Wl$^{-1}$), in electrochromic light modulation systems and antiglare mirrors for automobiles. In systems for separation or purification of metals, especially of lithium, water purification, in oxidation reactions or reduction reactions in organic synthesis; in the case of oxidation reaction it may be necessary to delithiate the material chemically or electrochemically to increase its oxidizing power.

A sixth object of the present invention consists of electrochemical cells containing at least two electrodes and at least one electrolyte, these cells being characterized in that at least one of their electrodes comprises at least one compound according to the third object of the invention.

A seventh object of the present invention consists of electrochemical cells containing at least two electrodes and at least one electrolyte, these cells being characterized in that at least one of their electrodes comprises at least one material according to the fourth object of the invention.

These cells are preferably designed in such a way that the electrolyte is a polymer, solvating or not, optionally plasticized or gelled by a polar liquid containing one or more metallic salts in solution, by way of example.

Advantageously, the electrolyte is a polar liquid immobilized in a microporous separator, containing one or more metallic salts in solution; by way of example at least one of these metallic salts is a lithium salt.

Preferably at least one of the negative electrodes is made of metallic lithium, a lithium alloy, especially with aluminum, antimony, zinc, tin, possibly in nanomolecular mixture with lithium oxide or a carbon insertion compound, especially graphite, a double nitride of lithium and iron, cobalt or manganese, a lithium titanate of the formula Li$_x$Ti$_{(5+3y)/4}$O$_4$, wherein $1 \leq x \leq (11-3y)/4$ (or) wherein $0 \leq y \leq 1$.

According to another embodiment of the cells according to the invention, at least one of the positive electrodes contains one of the products that can be obtained by a procedure according to the invention, used alone or in a mixture with a double oxide of cobalt and lithium or with a complex oxide of the formula Li$_x$Ni$_{1-y-z-q-r}$Co$_y$Mg$_z$Al$_r$O$_2$ wherein $0.1 \leq x \leq 1$, $0 \leq y$, z and $r \leq 0.3$, or with a complex oxide of the formula Li Mn$_{1-y-z-q-r}$Co$_y$Mg$_z$AlrO$_2$-qF$_q$ wherein $0.05 \leq x \leq 1$ and $0 \leq y$, z, r, $q \leq 0.3$.

The polymer used to bond the electrodes or used as electrolytes is advantageously a polyether, a polyester, a polymer based on methyl methacrylate units, an acrylonitrile-based polymer and/or a vinylidene fluoride, or a mixture of the latter.

Preferably, the cell contains a solvent that is preferably a non-protogenic solvent that contains, e.g. ethylene or propylene carbonate, an alkyl carbonate having 1 to 4 carbon atoms, γ-butyrolactone, a tetraalkylsulfamide, an α-ω dialkyl ether of a mono-, di-, tri-, tetra- or oligo-ethylene glycol with molecular weight less than or equal to 5000, as well as mixtures of the above-named solvents.

The cells according to the invention preferably function as primary or secondary generator, as supercapacity or as light modulation system.

According to another preferred method, the electrochemical cells according to the present invention function as supercapacity, characterized in that the positive electrode material is a material according to the third, fourth or the fifth object of the present invention and the negative electrode is a carbon with a specific surface area greater than 50 m$^2$.g$^{-1}$ in the form of powder, fiber or mesoporous composite of the carbon-carbon composite type.

According to another embodiment, the electrochemical cells function as a light modulation system and in that the optically inactive counter-electrode is a material according to the third, fourth and fifth object of the present invention, spread in a thin layer on a transparent conductor support of a glass or polymer type covered with doped tin oxide (SnO$_2$:Sb or SnO$_2$:F) or doped indium oxide (In$_2$O$_3$:Sn).

Preferred Methods

The proposed invention relates to a new method for simplified synthesis of Li$_x$MXO$_4$ compounds with olivine structure obtained by reduction of a mixture in which at least a part of the transition metal M is in an oxidation state higher than that of the final compound LiMPO$_4$. Another surprising advantage of the present invention is to also be compatible with the synthesis described in CA-A-2,270,771, which leads to optimized performance. In this case, the organic compound that is the carbon source is added to the mixture of the initial reagents containing, at least partially, transition metal in a state of oxidation greater than that of the lithium compound LiMPO$_4$ and the simplified synthesis leads directly to the material covered in carbon. The simplification involves, in particular, a reduction in the number of steps and above all, in the number of steps where control of the atmosphere is necessary. Reference can be made to "Modern Batteries", by C. A. Vincent & B. Scrosati, Arnold publishers, London, Sydney, Auckland, (1997).

The improvements also relate to the reproducibility of the synthesis, to the control of the size and distribution of the particles and to a reduction in the number and cost of the initial reagents and naturally of the final material. This synthesis, when combined with the teachings of CA-A-2,270,771, also makes it possible to control the amount of carbon in the final material.

We are reporting here, for the first time, the synthesis of a Li$_x$MXO$_4$ compound of olivine type, in this case LiFePO$_4$, produced by reduction of an iron (III) salt. Since the initial salts are no longer sensitive to oxidation, the synthesis process is greatly simplified. In addition, the possible use of Fe$_2$O$_3$ as a source of iron considerably reduces the cost of synthesizing LiFePO$_4$. This material would thus be preferable to other cathode materials for lithium batteries, such as cobalt or nickel oxides in the case of lithium-ion batteries, or vanadium oxides V$_2$O$_5$ or analogs that are less inoffensive to the environment.

LiFePO$_4$ can be prepared using an iron (III) salt that is stable in air, e.g. FePO$_4$.2H$_2$O Or Fe$_2$O$_3$ or any other source of iron (III). The lithium source would be e.g. Li$_2$CO$_3$ in the first case, or LiOH. LiH$_2$PO$_4$ or Li$_3$PO$_4$ would be used as a source of both lithium and phosphorus in the second case. The stoichiometric mixtures, as well as the carbon precursor, are processed at 700° C. for 4 hours with scavenging by an excess of reducing atmosphere in such a way as to reduce the oxidation state of the iron. The choice of the synthesis atmosphere and temperature is very important in order to be able to reduce the iron (III) to iron (II) without the gaseous atmosphere or the carbon present being able to reduce the iron to the metallic state. The latter will preferably, but in a non-limiting manner, be made up e.g. of hydrogen, ammonia, of a gaseous mixture capable of supplying hydrogen under the synthesis conditions, the hydrogen being able to be used pure or diluted in a dry or hydrated inert gas, carbon monoxide, possibly mixed with carbon dioxide and/or a dry or hydrated neutral gas. The maximum thermal processing temperature is chosen such that the carbon present will be thermodynamically stable with respect to the iron (II) and preferably with respect to the gaseous phase. In the case of iron, the limit temperature zone is between 500 and 800° C., preferably around 700° C. Beyond these temperatures, the carbon becomes sufficiently reducing to reduce the iron (II) to metallic iron. In the case of other transition metals, any person skilled in the art would be able to use Ellingham curves to adapt the temperature and the nature of the gaseous atmosphere in order to obtain an equivalent result.

An unexpected and surprising aspect of the invention that is advantageous is the relative chemical inertia of the carbon deposited on the surface of the material with respect to reactions that make it possible to reduce the degree of oxidation of the transition metal, in particular, of iron. From a thermodynamic point of view, the carbon formed by decomposition of the pyrolyzed organic substance has a reducing power that is adequate to oxidize into CO$_2$ or CO and to reduce, even in an inert atmosphere, Iron (III) to Iron (II), which would make controlling the amount of carbon in the final product difficult. The inventors have noted that the reduction reaction was almost totally due to the action of the reducing gas atmosphere, of which the kinetics are faster than those due to the action of the carbon deposited on the surface, in spite of the intimate contact between the two solid phases (carbon and redox material). By using a reducing atmosphere, preferably based on hydrogen, ammonia or carbon monoxide, the reduction of the iron by the solid carbon is not promoted kinetically and the Iron (III) is reduced to Iron (II) mainly by reaction with the reducing atmosphere. The amount of carbon in the final product thus essentially corresponds to the decomposition yield of the organic substance, which makes it possible to control this amount.

The following examples are given to better illustrate the present invention, but they should not be interpreted as constituting a limitation to the scope of the present invention.

EXAMPLES

Example 1

Synthesis of LiFePO$_4$ Using Iron Phosphate in Reducing Atmosphere.

LiFePO$_4$ was prepared by reaction of FePO$_4$.2H$_2$O and Li$_2$CO$_3$ in the presence of hydrogen. In a first step, stoichiometric quantities of the two compounds are ground together in isopropanol, then heated progressively (6° C. per minute up to 700° C.) in a tube kiln under reducing gas scavenging (8% hydrogen in argon). This temperature is maintained for one hour. The sample is cooled for 40 minutes, which would be with a cooling speed of around 15° C. per minute.

The reducing gas flow is maintained during the entire thermal processing time and also during the temperature drop. The total thermal processing time is around three and a half hours.

The structure of the sample was verified by X-ray diffraction and the rays correspond to those of pure triphylite LiFePO$_4$.

Example 1'

Preparation of LiFePO$_4$ Coated with Carbon Synthesized Using the Sample Prepared in Example 1

The triphylite obtained in example 1 is impregnated with a solution of cellulose acetate (39.7% by weight of acetyl, average molecular weight M$_w$ of 50,000) in acetone. The quantity of cellulose acetate added represents 5% of the weight of the processed triphylite. The use of a carbon precursor in solution makes possible a perfect distribution over the particles of triphylite. After drying, the mixture is placed in the kiln described above under scavenging by an argon atmosphere. The temperature is increased by 6° C. per minute up to 700° C. The latter temperature is maintained for one hour. The sample is then cooled progressively, still under argon scavenging. This sample contains 1% by weight of carbon, which corresponds to a carbonation yield of the cellulose acetate of 20%.

The material exhibits electronic surface conductivity. The latter was measured on a pastille of compacted powder. A force of 5 tons is applied at the time of measurement on a sample that is 1.3 cm in diameter. Under these conditions, the electronic conductivity measured is $5.10^{-5}$ S.cm$^{-1}$.

Example 1"

Comparison of the Electrochemical Behavior of Materials Prepared in Examples 1 and 1' in Electrochemical Cells The materials prepared in example 1 and 1' were tested in button-type CR 2032 cells of lithium polymer batteries at 80° C. The cathodes were prepared by mixing the powder of the active material with carbon black (Ketjenblack®) to insure electronic exchange with the current collector and poly(ethylene oxide) with mass 400,000 used as the binding agent on one hand, and ionic conductor on the other. The proportions by weight are 51:7:42. Acetonitrile is added to the mixture to dissolve the poly(ethylene oxide) in a quantity that is adequate to form a homogeneous suspension. This suspension is then dripped onto a 1 cm$^2$ stainless steel disk. The cathode thus prepared is dried in a vacuum, then transferred in a glove box under helium atmosphere (<1 ppm H$_2$O, O$_2$). A sheet of lithium (27 μm) laminated on a nickel substrate was used as the anode. The polymer electrolyte was made of poly(ethylene oxide) with mass 5,000,000 and a bistrifluorosulfonimide lithium salt Li[(CF$_3$SO$_2$)$_2$N]) (hereinafter referred to as LiTFSI) in oxygen proportions of oxyethylene units/lithium ions of 20:1.

Electrochemical experiments were carried out at 80° C., the temperature at which the ionic conductivity of the electrolyte is adequate ($2\times10^{-3}$ Scm$^{-1}$).

FIG. 1 shows the first cycle obtained by slow voltametry, a technique well known to the person skilled in the art (20 mV.h$^{-1}$), controlled by a Macpile® type battery cycler (Biologic™, Claix, France), of the samples prepared in example 1 and 1'.

The non-carbonated compound in example 1 shows the oxidoreduction peaks characteristic of LiFePO$_4$. The capacity exchanged at the time of the reduction process represents 74% of the theoretical value. The reaction kinetics are slow and the discharge extends to 3 volts. These capacity and kinetic limitations of the reactions are currently observed for the samples of non-carbonated LiFePO$_4$. The carbonated compound from example 1' shows well-defined oxidoreduction peaks and reaction kinetics that are much more rapid than those of the material resulting from the synthesis described in example 1. The capacity achieved in discharge is 87% of the theoretical value, which represents an improvement in the electrochemical generator capacity of 17% in comparison to that of the non-carbonated sample in example 1.

Example 2

Synthesis of Carbonated LiFePO$_4$ Using Iron Phosphate in Reducing Atmosphere Carbonated LiFePO$_4$ was prepared by reducing reaction of FePO$_4$.2H$_2$O and Li$_2$CO$_3$ in the presence of hydrogen. In a first step, the stoichiometric quantities of the two compounds, as well as the carbon source, (cellulose acetate, 39.7% by weight of acetyl, average molecular weight M$_w$ of 50,000) in low proportion (5% by weight in comparison to the weight of FePO$_4$.2H$_2$O, i.e. 4.2% in comparison to the weight of the mixture of FePO$_4$.2H$_2$O and Li$_2$CO$_3$) are ground together in isopropanol. The solvent is evaporated and the mixture subjected to the thermal processing described in examples 1 and 1'. Throughout the entire thermal processing and also at the time of the temperature drop, the reducing atmosphere is applied by a scavenging of a mixture of 8% hydrogen in argon.

The structure of the sample was verified using X-ray diffraction and the rays correspond to those of pure triphylite LiFePO$_4$.

Figure 2:
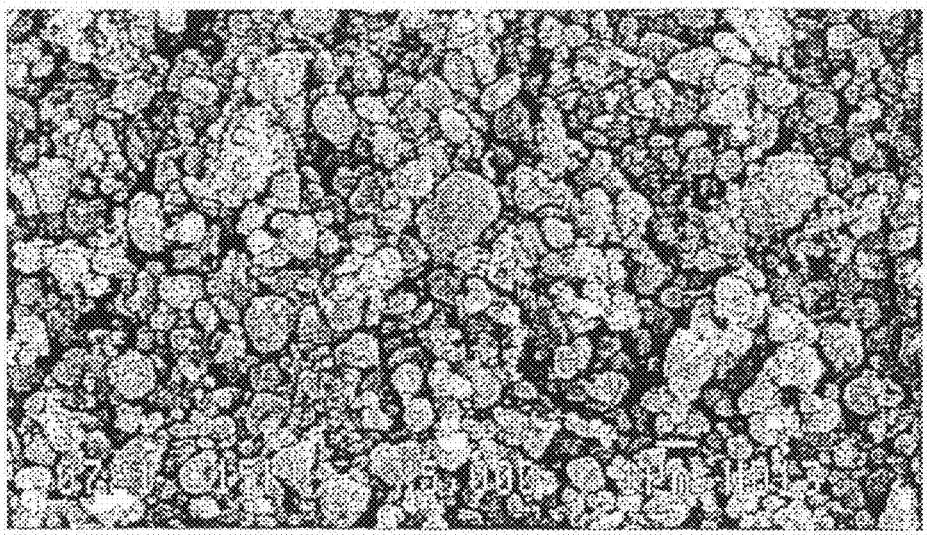
FIG. 2: Morphology of carbonated LiFePO$_4$ synthesized using FePO$_4$.2H$_2$O (reduction by hydrogen). Micrograph taken on a scanning electron microscope with 5000× magnification.

The prepared sample is constituted by very fine particles on the order of a micrometer (FIG. 2). These particles are covered with a fine layer of carbon, of which the weight represents 1.2% of the total weight of the sample, measured by gravimetry after dissolving the core of LiFePO$_4$ in 2M hydrochloric acid.

The material exhibits electronic surface conductivity. The latter was measured according to the procedure described in example 1'. Under these conditions, the electronic conductivity measured is 2.10$^{-3}$ S.cm$^{-1}$.

Taking into account the residual quantity of carbon in the sample, the carbonation yield of the cellulose acetate at the time of synthesis is 20%. It is important to note that this yield is identical to that obtained in example 1', where the triphylite LiFePO$_4$ is already formed and no reducing step is necessary.

Thus it is evident that the carbon that comes from decomposition of the cellulose acetate is not consumed and does not interfere in the reaction that reduces iron (III) to iron (II). Thus this reduction is carried out by means of the gaseous phase.

Example 2'

Comparison of the Electrochemical Behavior of the Carbonated Triphylite LiFePO$_4$ Prepared in Example 1 to that of a Sample of Carbonated Triphylite Synthesized by Another Method The material prepared in example 2 was tested in CR 2032 button cells described in example 1". For comparison, we also are reporting several results obtained for the best carbonated sample synthesized using iron (II) (vivianite Fe$_3$(PO$_4$)$_2$.8H$_2$O), the synthesis of which has already been described in CA-A-2,270,771.

Figure 3:
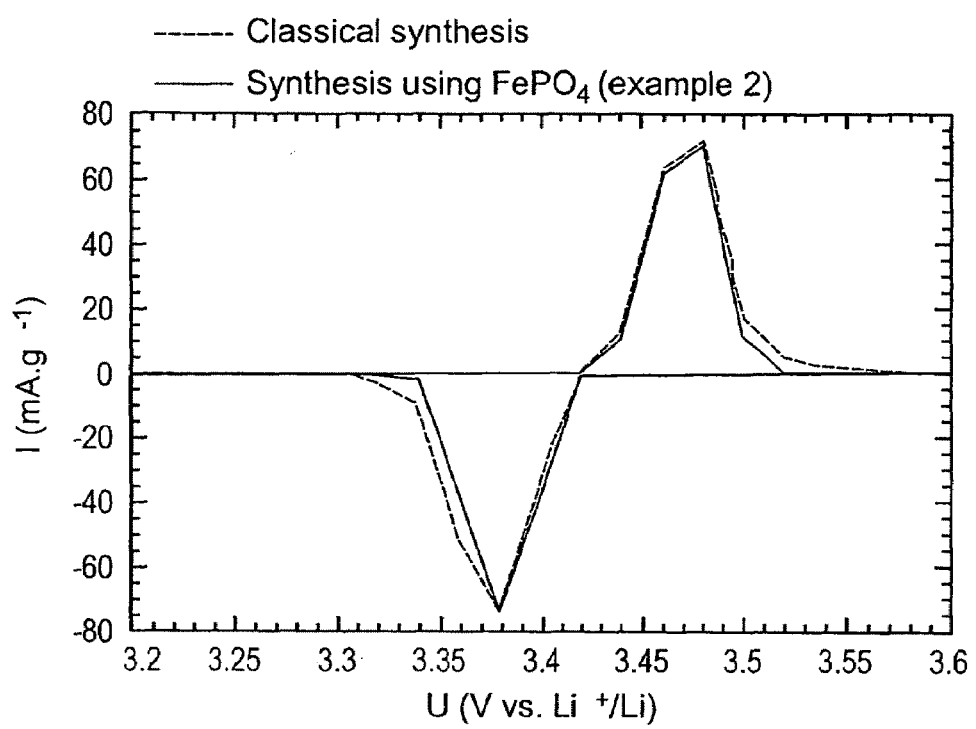
FIG. 3: 5th cycle obtained by slow voltametry ($v=20$ mV.h$^{-1}$) at 80° C. of a battery containing carbonated LiFePO$_4$, synthesized using FePO$_4$.2H$_2$O (reduction by hydrogen) (solid lines) compared to an LiFePO$_4$ obtained using classical synthesis followed by a carbon deposition step (dotted lines).

FIG. 3 presents the 5$^{th}$ cycle obtained by slow voltametry (20 mV.h$^{-1}$) controlled by a battery cycler of the Macpile® type with the sample resulting from classical synthesis (dotted lines) on one hand, to that obtained in example 2 (solid lines) on the other. The two syntheses lead to samples having the same electrochemical behavior on the level of oxidoreduction potentials and electrochemical kinetics.

Figure 4:
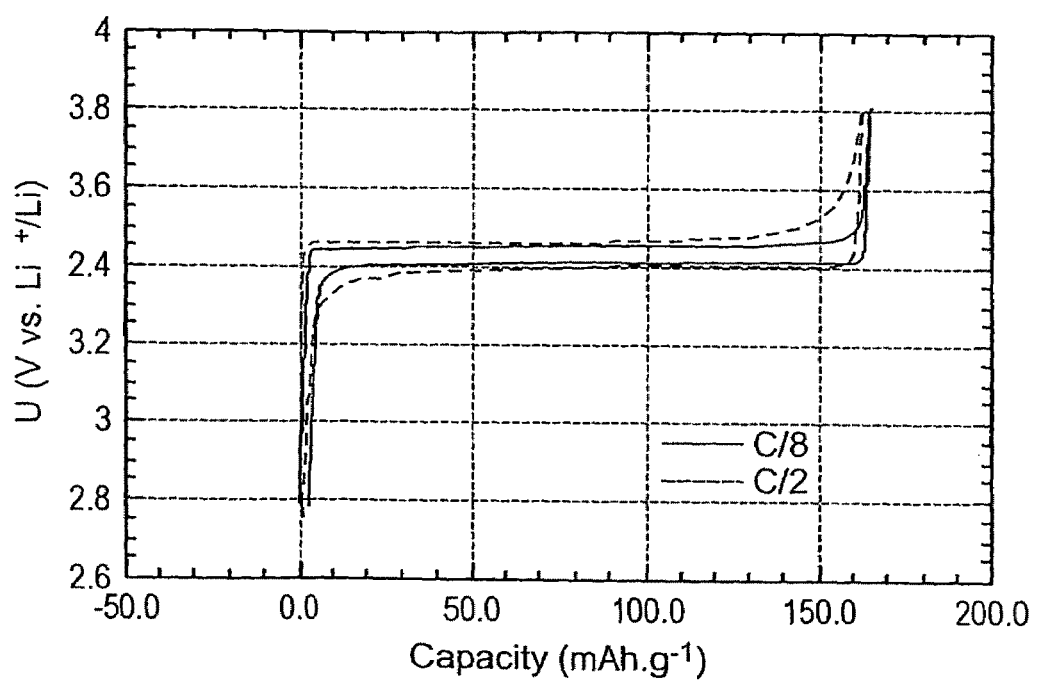
FIG. 4: Profiles of charging and discharging carried out in galvanostatic mode at 80° C. and at two charging and discharging speeds (C/8: solid lines and C/2: dotted lines) for batteries containing carbonated LiFePO$_4$ synthesized using FePO$_4$.2H$_2$O (reduction by hydrogen).

The charging and discharging profiles of batteries assembled with the sample resulting from the synthesis described in example 2 are presented in FIG. 4 for two loads. These results are obtained in galvanostatic mode between 2.8 and 3.8 volts for two charging and discharging speeds C/8 and C/2 (the current applied (expressed in mA) at the time of charging or discharging corresponds to ⅛ (or ½ respectively) of the theoretical capacity of the battery expressed in mAh. We have reported the 20$^{th}$ cycle and in the two cases, the discharge plateau is flat and the capacities involved correspond to 95% of the theoretical capacity.

Figure 5:
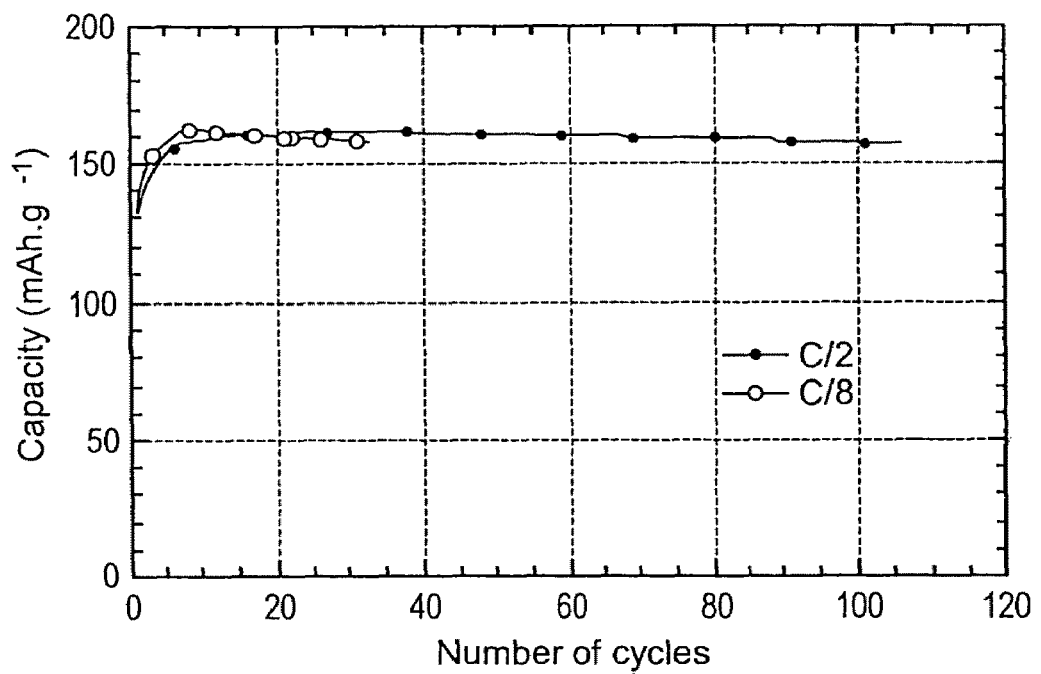
FIG. 5: Results of the cycling carried but in galvanostatic mode at 80° C. and at two charging and discharging speeds for batteries containing carbonated LiFePO$_4$ synthesized using FePO$_4$.2H$_2$O (reduction by hydrogen).

The trend in capacities exchanged at the time of discharging is represented in FIG. 5. In both cases, the initial capacity is around 80% of the theoretical capacity but, after around ten cycles, it is greater than 95%, i.e. at 160 mAh.g$^{-1}$, and remains stable for the duration of the experiment. These results are comparable to those obtained with classical synthesis (reaction of divalent iron phosphate (vivianite) with lithium phosphate).

Example 3

Control of the Carbon Quantity

Samples of triphylite with different amounts of carbon were prepared by reaction of FePO$_4$.2H$_2$O and Li$_2$CO$_3$ in die presence of a 1:1 mixture by volume of CO/CO$_2$. This atmosphere was chosen for its reducing power with respect to iron (III) while maintaining a stability of the iron (II), in particular at the end of the cycle for the rise to the synthesis temperature at 700° C. In a first step, the stoichiometric quantities of the two compounds, as well as the cellulose acetate, are ground together in isopropanol. The cellulose acetate quantities added represent 2.4 and 5%, respectively, of the mixture weight. After drying, these mixtures are heated progressively (6° C. per minute up to 700° C.) in a tube kiln with scavenging of the reducing gas (CO/CO$_2$: 1:1). This temperature is maintained for one hour. The sample is cooled for 40 minutes, which would be with a cooling speed of around 15° C. per minute. The reducing gas flow is maintained during the entire thermal processing time and also during the temperature drop. The total thermal processing time is around three and a half hours.

The structure of the samples was verified by X-ray diffraction and in all cases, the rays correspond to those of pure triphylite LiFePO$_4$.

The amounts of carbon were determined by elementary analysis. The results, as well as the electronic conductivities, of the samples are shown in Table 1 below.

TABLE 1

| % Cellulose acetate | Amount of C | Yield (C) | Conductivity |
|---|---|---|---|
| 2 | 0.62 | 0.22 | $2.10^{-6}$ S·cm$^{-1}$ |
| 4 | 1.13 | 0.2 | $1.10^{-3}$ S·cm$^{-1}$ |
| 5 | 1.35 | 0.19 | $4.10^{-2}$ S·cm$^{-1}$ |

In the three cases, the carbonation yield (yield C) of table 1 for cellulose acetate) is close to 20%.

The residual carbon quantity has a significant influence on the electronic conductivity. As can be seen, the quantities of carbon conductor are proportional to the quantity of precursor added (cellulose acetate). This demonstrates, in a formal way, that the carbon conductor does not participate in the reduction of iron (III) in the presence of reducing gas atmosphere, the latter reducing the iron compound with more rapid kinetics.

Example 3'

Comparison of Electrochemical Hehavior of the Samples of Carbonated Triphylite Prepared in Example 3

The materials prepared in example 3 were tested in CR 2032 button cells described in example 1".

Figure 6:
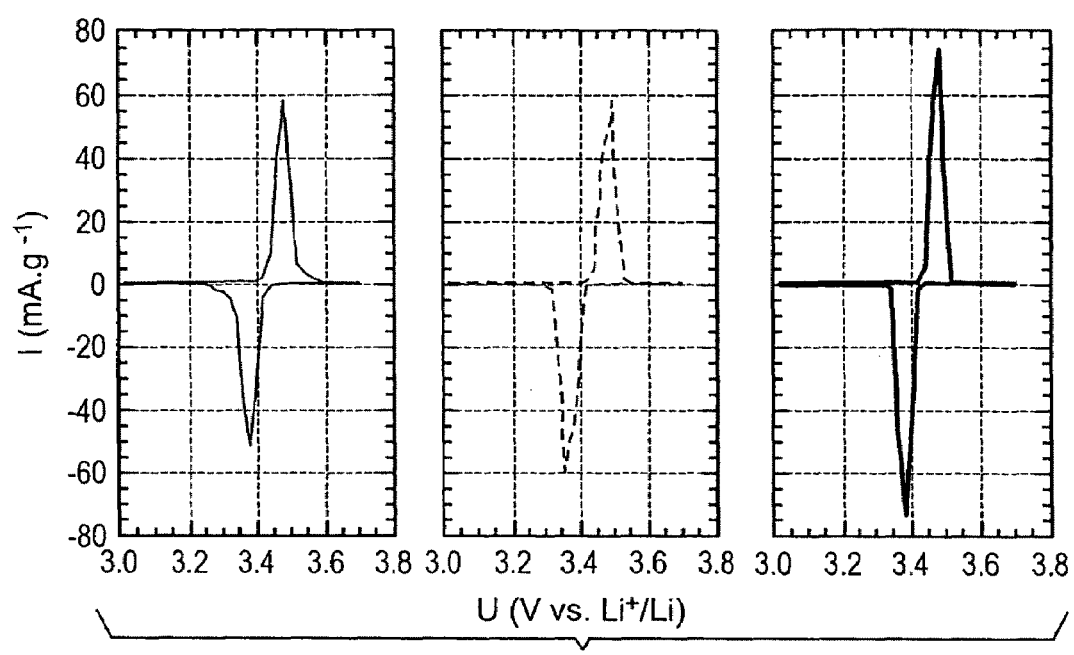
FIG. 6: 5th cycle obtained by slow voltametry ($v=20$ mV.h$^{-1}$) at 80° C. of batteries containing carbonated LiFePO$_4$ synthesized using FePO$_4$.2H$_2$O (reduction 1:1 CO/CO$_2$) for samples containing different carbon percentages (0.62%: solid lines, 1.13% dotted lines, 1.35% bold lines).

FIG. 6 shows the 5$^{th}$ cycle obtained by slow voltametry (20 mV.h$^{-1}$) controlled by a battery cycler of the Macpile® type with:

the sample containing 0.62% carbon (solid lines);
the sample containing 1.13% carbon (dotted lines); and
the sample containing 1.35% carbon (bold lines);

The main characteristics of the electrochemical behavior of these samples are summarized in Table 2 below:

TABLE 2

| % Carbon | 0.62 | 1.13 | 1.35 |
|---|---|---|---|
| Capacity (mAh·g$^{-1}$) | 150 | 160 | 163 |
| % Theoretical capacity | 88 | 94 | 96 |
| I peak (mA) | 52 | 60 | 73 |

The residual carbon quantity has an important influence on the capacity of the samples. In addition, the increase in the peak current with the amount of carbon indicates an improvement in the reaction kinetics. The latter reflects the increase in electronic conductivity with the amount of carbon specified in example 3. The synthesis method described in example 3 makes it possible to reliably and reproducibly control the amount of carbon in the final material. This is essential, taking into account the influence of the amount of carbon on the electrochemical properties.

Example 4

Counter-Example of Reduction Using Carbon

LiFePO$_4$ was prepared by reaction of FePO$_4$.2H$_2$O and Li$_2$CO$_3$ in the presence of carbon, in inert atmosphere according to the procedure described in the PCT application with the number WO 01/53198.

The stable oxidation product of the carbon is CO$_2$ below 710° C. and CO above that. In addition, above 400° C., CO$_2$ reacts on the excess of carbon to form CO. This latter reaction is equilibrated and the CO/CO$_2$ ratio depends on the temperature. Thus it is difficult to determine the carbon quantity to be added to the mixture of FePO$_4$.2H$_2$O and Li$_2$CO$_3$. If only CO$_2$ is produced, ¼ mol of carbon is enough to reduce one mol of iron (III) to iron (II) and if only CO is produced, ½ mol of carbon is necessary for the same reaction.

This synthesis was carried out for two different mixture compositions:

First mixture (mixture 4A), identical to that in patent WO 01/53198
1 mol of FePO$_4$.2H$_2$O
½ mol of Li$_2$CO$_3$.
1 mol of C In the case where only CO would be produced at the time of iron (III) reduction, this stoichiometry would correspond to an excess of carbon of 100%.

Second mixture (mixture 4B)
1 mol of FePO$_4$.2H$_2$O
½ mol of Li$_2$CO$_3$
½ mol of C Stoichiometric mixture if only CO is produced at the time of iron reduction. The synthesis procedure used is the one proposed in WO 01/53198: the mixtures are ground in isopropanol, then dried. The powder is then compacted into pastilles. The pastilles are placed in a tube kiln with argon scavenging. The temperature of the kiln is brought progressively to 750° C. at a heating speed of 2° C. per minute. The sample is held at 750° C. for 8 hours according to WO 01/53198 before it is cooled at 2° C. per minute to ambient temperature. For the entire duration of thermal processing, the enclosed space in the kiln is scavenged by an argon current. The total time of this thermal processing is 20 hours. The pastilles are then powdered. Elementary analyses indicating that the two samples contain carbon are shown in table 3 below:

TABLE 3

| | Initial carbon (Mol) | Final carbon % sample | Residual carbon (Mol) | Carbon consumed Mol |
|---|---|---|---|---|
| Sample A | 1 | 5.87 | 0.82 | 0.18 |
| Sample B | 0.5 | 1.7 | 0.23 | 0.27 |

Synthesis B indicates that only around ¼ mol of carbon was consumed by transformation into CO$_2$ to reduce one mol of iron (III) to iron (II), even though the final temperature is greater than 710° C. This confirms the difficulty of controlling the stoichiometry by this reducing method.

At the time of synthesis of sample A, carried out according to the teachings of WO 01/53198, the quantity of carbon consumed is inadequate for the reduction reaction of iron (III) to iron (II) to be complete. By increasing the quantity of carbon, the probability is decreased of having the triple points of contact between iron phosphate, lithium carbonate and carbon that are necessary for formation of LiFePO$_4$.

At the time of this synthesis, the maximum formation yield of LiFePO$_4$ is 80%. Taking into account the residual carbon present, the purity of sample A is around 75%. This consideration corroborates the mediocre electrochemical activity of 70% obtained according to the teachings of WO 01/53198.

Example 4'

Electrochemical Behavior of Sample B Synthesized in Example 4

Figure 7:
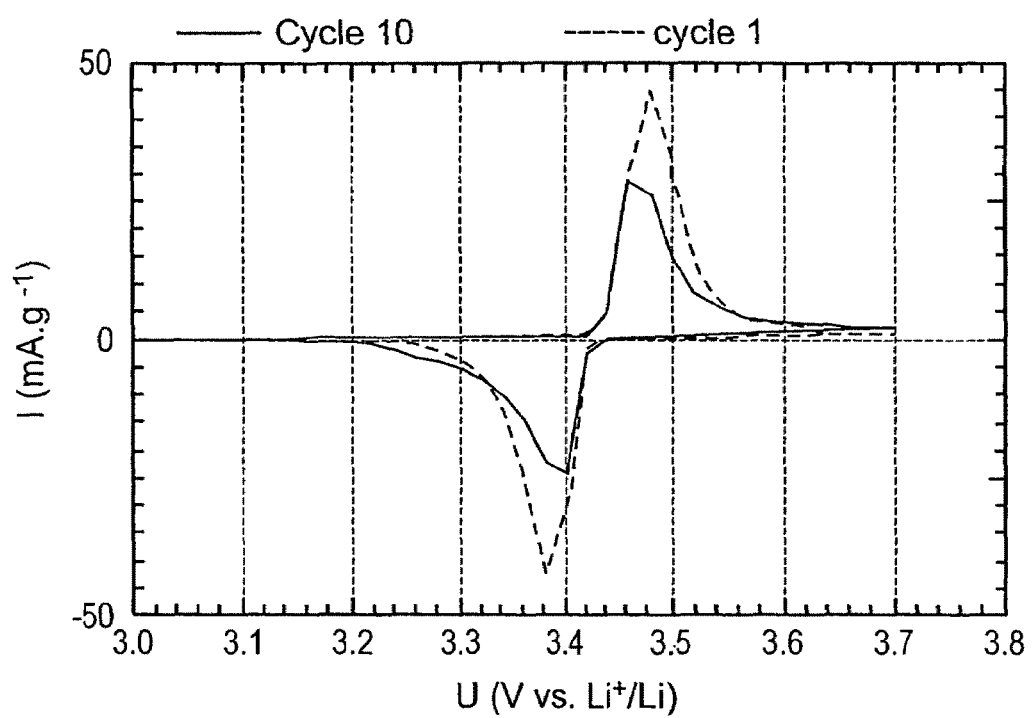
FIG. 7: 1st cycle (dotted lines) and 10th cycle (solid lines) obtained using slow voltametry ($v=20$ mV.h$^{-1}$) at 80° C. of a battery containing LiFePO$_4$ synthesized using FePO$_4$.2H$_2$O (reduction by carbon).
Figure 8:
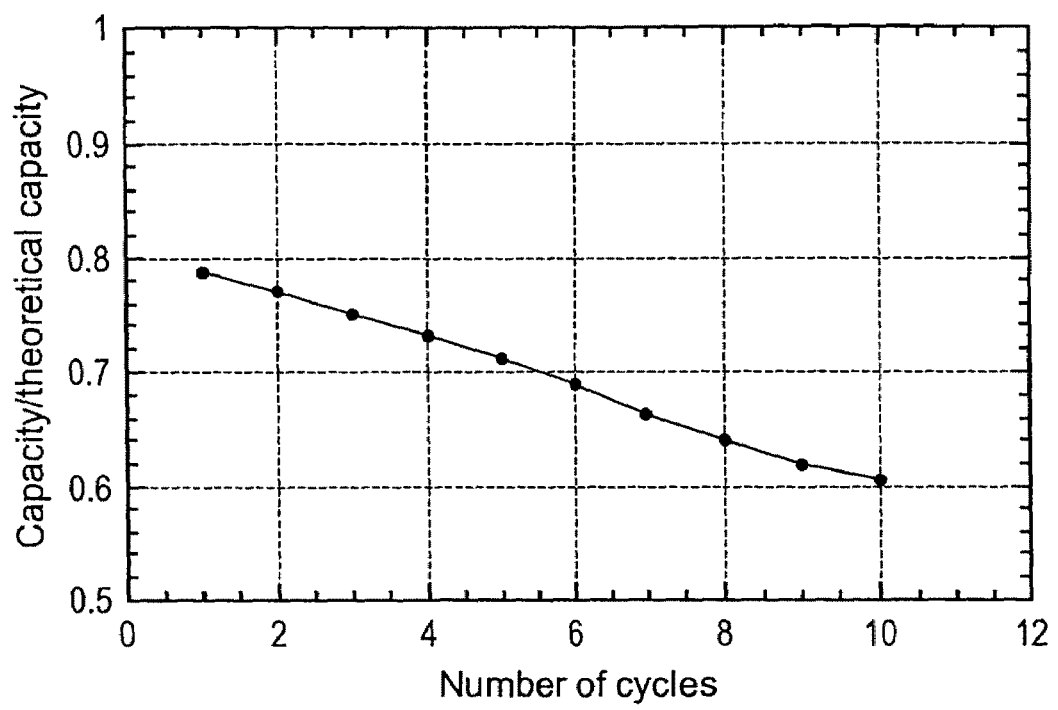
FIG. 8: Trend in the capacity in the course of cycling of a battery containing LiFePO$_4$ synthesized using FePO$_4$.2H$_2$O (reduction by carbon). Results obtained using slow voltametry ($v=20$ mV.h$^{-1}$) at 80° C.

The material 4B prepared in example 4 was tested in CR 2032 button cells described in example 1". FIG. 7 shows the first (dotted lines) and the $10^{th}$ (solid lines) cycles obtained by slow voltametry (20 mV·h$^{-1}$) controlled by a Macpile® type battery cycler. FIG. 8 illustrates the trend in the battery capacity with cycling.

These two figures show a rapid deterioration in the electrochemical behavior of the sample. The kinetics are slower, starting from the $10^{th}$ cycle. In addition, after 10 cycles, the battery has lost 23% of its initial capacity. This behavior is generally observed for samples of LiFePO$_4$ not covered with carbon. The residual carbon, dispersed in the material, does not have the same beneficial effect as the carbon coating the grains of LiFePO$_4$ and deriving from the decomposition of an organic substance.

Example 5

Reduction by the Substances Produced at the Time of Decomposition of an Organic Substance Reduction by Cellulose Acetate (39.7% by Weight of Acetylated Groups)

In a first step, stoichiometric quantities of the two compounds FePO$_4$.2H$_2$O and Li$_2$CO$_3$, as well as cellulose acetate, are ground together in acetone. The quantity of cellulose acetate added represents 5% of the weight of the initial mixture.

For example:
FePO$_4$.2H$_2$O: 186.85 g
Li$_2$CO$_3$: 36.94 g
Cellulose acetate 11.19 g After drying, the mixture is placed in a tube kiln with UHP (Ultra High Purity) argon scavenging; this gas also circulates across an oxygen trap, of which the residual amount is ≦1 pm). The kiln is heated progressively at 6° C. per minute, up to 200° C. This temperature is maintained for 20 minutes to dehydrate the iron phosphate. The temperature is increased at the same heating speed up to 400° C. This temperature is maintained for 20 minutes to decompose the cellulose acetate and the lithium carbonate. After a third ramp up to 700° C. at 6° C. per minute, where the sample is held for one hour to impart better crystallinity, the sample is cooled progressively. The inert gas flow is maintained during the entire thermal processing time and also during the temperature reduction.

The structure of the samples was verified by X-ray diffraction and in all cases, the rays correspond to those of pure triphylite LiFePO$_4$.

The elementary analysis shows that the sample contains 0.74% carbon (0.098 mol of carbon per mol of LiFePO$_4$).

The electronic conductivity measured as described in example 1' is 5.10$^{-4}$ S·cm$^{-1}$.

The carbonation yield of the cellulose acetate given in the literature is 24%. Using 11.19 g cellulose acetate, it is possible to obtain 2.68 g, i.e. 0.22 mol carbon. At the end of the reaction, 0.098 mmol carbon remains. The quantity of carbon consumed is not sufficient to explain the reduction of iron (III) to iron (II) by the carbon.

To explain the reduction of iron (III) to iron (II), it is necessary to consider the intervention of a local reducing gaseous phase resulting from the decomposition of the cellulose acetate.

The cellulose acetate can be written C$_6$H$_{10-x}$O$_5$(CH$_3$CO)$_x$; with 39.7% by weight of acetyl groups, the calculation yields x=2.44, thus the formula of this product is C$_6$H$_{7.56}$O$_5$(CH$_3$CO)$_{2.44}$ as with an average molar mass of 265.

Since cellulose acetate is a hydrate of carbon, its reducing power can thus be calculated by taking nothing into account except the number of total carbon atoms, i.e. 10.88 in the product used. With a reducing power of 4 electrons per mol of carbon.

Initially, the mixture contains 4.2 10$^{-2}$ mol of cellulose acetate, i.e. 0.459 mol carbon. The final product contains 9.8 10$^{-2}$ mol carbon. 0.36 Mol carbon was consumed, which is adequate for explaining the synthesis of LiFePO$_4$ under these conditions.

Example 5'

Electrochemical Behavior of the Sample of Carbonated Triphylite Prepared in Example 5

The material prepared in example 5 was tested in CR 2032 button cells described in example 1".

Figure 9:
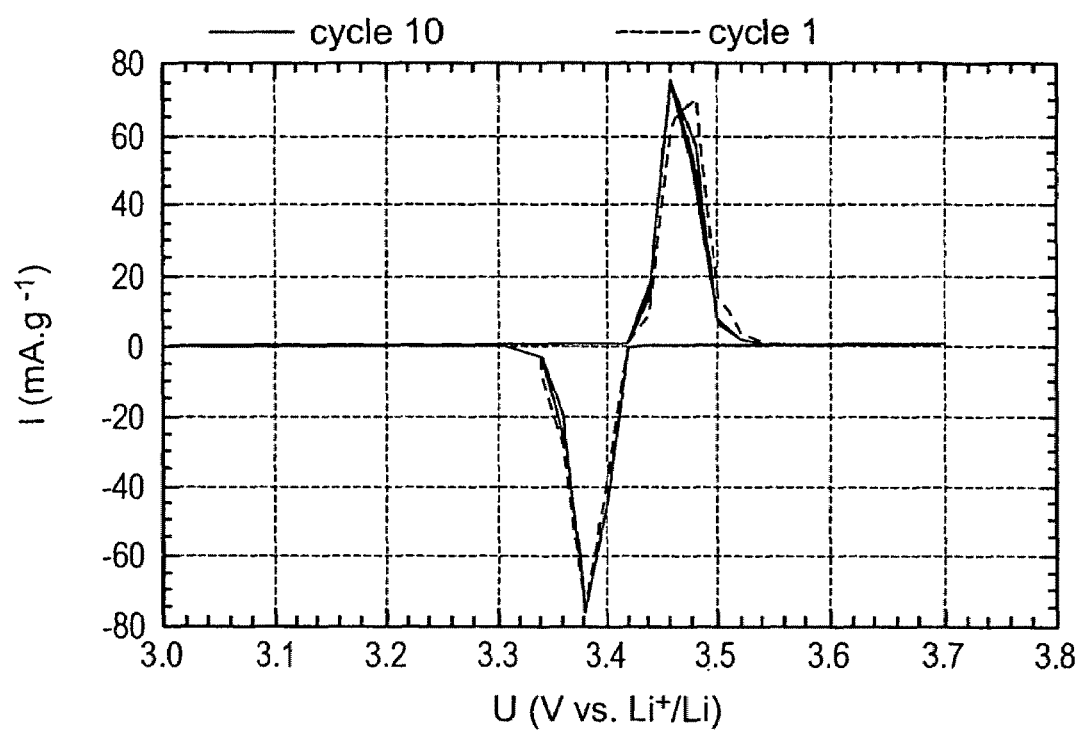
FIG. 9: 1st cycle (dotted lines) and 10th cycle (solid lines) obtained using slow voltametry ($v=20$ mV.h$^{-1}$) at 80° C. of a battery containing LiFePO$_4$ synthesized using FePO$_4$.2H$_2$O (reduction by cellulose acetate)
Figure 10:
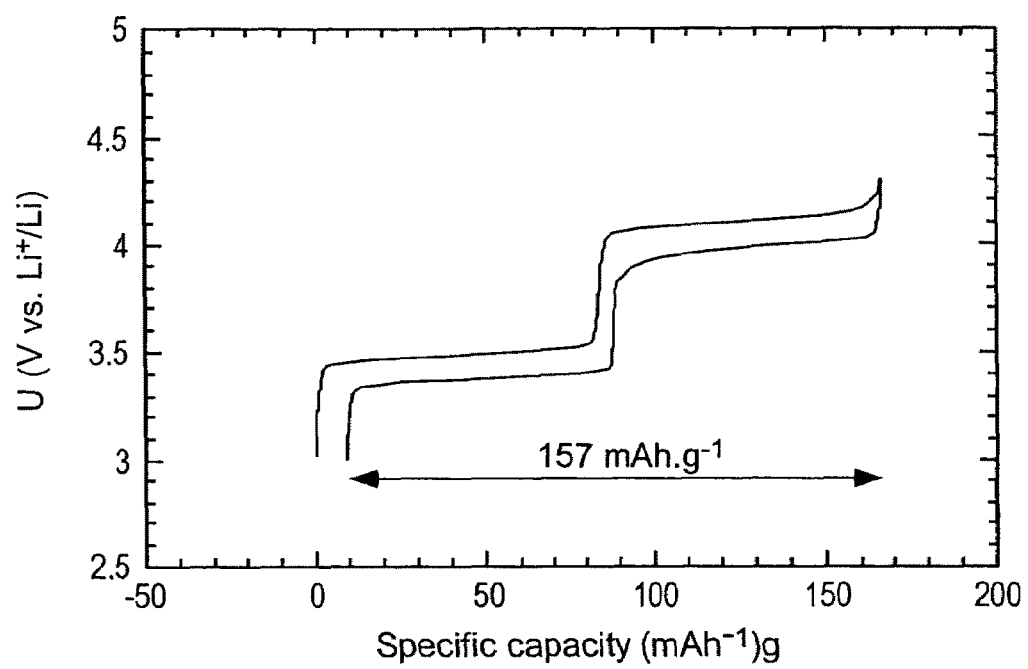
FIG. 10: Charging and discharging profiles carried out in galvanostatic mode at ambient temperature at a charging and discharging speed of C/24 for batteries containing carbonated LiFe$_{0.5}$Mn$_{0.5}$PO$_4$.

FIG. 9 shows cycles 1 and 10 obtained by slow voltametry (20 mV.h$^{-1}$) controlled by a battery cycler of the Macpile® type. The two cycles are superimposed, which indicates good cycling capability. The initial capacity of this sample is 92% of the theoretical capacity. This capacity is maintained in cycling.

Even though it leads to samples of LiFePO$_4$ with good performance, the synthesis taught in example 5 is relatively restricting at the laboratory level, in spite of its simplicity. In fact, only the cellulose acetate, and at the end of the synthesis the residual carbon, can buffer the atmosphere. Thus it is essential to work with neutral gases purified from all traces of water and oxygen, which is difficult to carry out at the industrial level. A variation in the gas purity or a lack of seal integrity in the kiln manifests itself by the obtaining of an oxidized product.

Example 6

Preparation of an Iron Phosphosulfate with Nasicon Structure

In a 500 ml polypropylene flask, 9.4 g of trivalent iron phosphate FePO$_4$,2H$_2$O, 7 g trivalent iron sulfate, 4.4 g of ammonium and titanium oxalate complex (NH$_4$)$_2$TiO(C$_2$O$_4$)$_2$, 6.2 g of ammonium sulfate and 8.9 g lithium acetate, 1.7 g sucrose and 250 ml methylethylacetone are added. The mixture is ground on rubber rollers in the presence of aluminum cylinders (Φ=10 mm, H=10 mm) for 48 hours. The suspension is dried and the powder is ground again in a mortar. The powder obtained is processed at 400° in air for 2 hours. After cooling, the calcination residue is processed at 670° C. for one hour in a tube kiln in an atmosphere of ammonia in argon (5%), the temperature being raised 5° C. per minute. The gas scavenging is maintained throughout the cooling.

The gray-black product obtained has the formula Li$_{1.35}$Fe$_{0.85}$Ti$_{0.15}$SP$_{0.5}$O$_6$ and contains 1.3% carbon conductor. The material tested as an electrode under the conditions in example 1' has a capacity of 115 mAh in the voltage range 3.6-2.5 V.

Example 7

Synthesis Using Non-Commercial Iron Phosphate Prepared from Metallic Iron

In this example, carbonated $LiFePO_4$ was synthesized using non-commercial iron phosphate obtained by the action of phosphoric acid on metallic iron.

The iron powder (325 mesh) was mixed in stoichiometric quantity of an aqueous solution prepared using a commercial solution of 85% phosphoric acid. The mixture was kept under agitation overnight at ambient temperature. Bubbling oxygen through makes it possible to oxidize the iron (II) passing in solution into iron (III), which precipitates with the phosphate ion. After one night, the solution no longer contains metallic iron, but rather a slightly grayish powder. Since the solutions of iron (II) are very sensitive to oxidation, the majority of the iron is in oxidation state (III). In certain cases, after dissolving of the metallic iron by bubbling oxygen in, a supplementary oxidation was carried out using hydrogen peroxide to insure that all of the iron is in oxidation state (III). In this case, the powder in solution is slightly yellowish due to traces of the peroxo complexes.

The stoichiometric quantity of lithium calculated using the quantity of initial metallic iron was added in the form of lithium carbonate, as well as the carbon source (87% hydrolyzed polyvinyl alcohol: 20% by weight in comparison to the weight of initial iron) directly in the solution+powder mixture. The grinding is carried out in this medium. After evaporation of the aqueous solution the mixtures were subjected to thermal processing described in example 2.

The products obtained contain 1.1% carbon (determined by elementary analysis). Their electronic conductivity measured as described in example 1' is $2.10^{-3}$ $S.cm^{-1}$. Their electrochemical behavior corresponds to carbonated $LiFePO_4$. 90% of the theoretical capacity is exchanged in a reversible manner in the course of cycling.

Example 8

Synthesis Using Non-Commercial Iron Phosphate Prepared from $Fe_2O_3$

In this example, carbonated $LiFePO_4$ was synthesized using non-commercial iron phosphate obtained by the action of phosphoric acid on ferric oxide $Fe_2O_3$. The $Fe_2O_3$ powder (<5 microns) was mixed in stoichiometric quantity of an aqueous solution prepared using a commercial solution of 85% phosphoric acid. The mixture was kept under agitation overnight under reflux. After one night, the mixture contains a pale pink powder. As before, the quantity of lithium carbonate required, as well as the carbon source (87% hydrolyzed polyvinyl alcohol: 15% by weight in comparison to the weight of initial $Fe_2O_3$), was added directly to the solution containing the synthesized iron phosphate powder. After grinding, the aqueous solution is evaporated. The mixture is dried before being subjected to the thermal processing described in example 2.

The products obtained contain 0.7% carbon (determined by elementary analysis). Their electronic conductivity measured as described in example 1' is $2.10^{-5}$ $S.cm^{-1}$. Their electrochemical behavior corresponds to carbonated $LiFePO_4$. 85% of the theoretical capacity is exchanged in a reversible manner in the course of cycling.

Example 9

Synthesis of Carbonated $LiFePO_4$ Using Iron Oxide FeOOH

Carbonated $LiFePO_4$ was synthesized by thermal decomposition of FeOOH (catalyst grade, 30 to 50 mesh) and $LiH_2PO_4$ in the presence of hydrogen (8% in argon). In a first period of time, the stoichiometric quantities of the two compounds, as well as the carbon source (sucrose, 15% by weight in comparison to the weight of the initial FeOOH) are ground together in isopropanol. The solvent is evaporated and the mixture is subjected to the thermal processing described in example 2.

The resulting sample contains 0.8% carbon. Its electronic conductivity measured as described in example 1' is $6.10^{-5}$ $S.cm^{-1}$. Its electrochemical behavior corresponds to carbonated $LiFePO_4$. 92% of the theoretical capacity is exchanged in a reversible manner in the course of cycling.

Example 10

Preparation of $LiFe_{0.5}Mn_{0.5}PO_4$ in Reducing Atmosphere $LiFe_{0.5}Mn_{0.5}PO_4$ was prepared by mixing stoichiometric quantities of $LiH_2PO_4$, $FeC_2O_4.2H_2O$ and $(CH_3COO)_2Mn.4H_2O$. These compounds are ground in heptane. After drying, the mixture is heated progressively to 400° C. in air to decompose the acetate and oxalate groups. This temperature is maintained for 8 hours. In the course of this processing, iron (II) oxidizes to iron (III). The mixture is then ground again in an acetone solution containing the carbon precursor (cellulose acetate 39.7% by weight of the groups) 5% by weight with respect to the mixture). After drying, the mixture is processed thermally with 1:1 $CO/CO_2$ scavenging according to the protocol described in example 3.

The final compound contains 0.8% carbon. Its electronic conductivity is $5.10^{-4}$ $S.cm^{-1}$

Example 10'

Performance of a Battery Containing the Sample Prepared in Example 10

The electrochemical behavior of the $LiFe_{0.5}Mn_{0.5}PO_4$ sample was evaluated at ambient temperature in a lithium battery containing a liquid electrolyte.

The cathodes are made up of a mixture of active material, of carbon black and of a bonding agent (PVDF in solution in N-methylpyrrolidone) in a ratio of 85:5:10. The composite is spread on an aluminum current collector. After drying, the electrodes of 1.3 $cm^2$ and with a capacity of around 1.6 mAh are cut with a hollow punch. The batteries are assembled in a glove box with inert atmosphere.

The measurements are carried out in an electrolyte containing 1M $LiClO_4$ in an EC:DMC mixture 1:1. The anode is made of lithium. The tests are carried out at ambient temperature.

FIG. 8 presents the charging and discharging curves of a battery cycled in galvanostatic mode between 3 and 4.3 volts. The charging and discharging loads applied correspond to C/24 (the battered is charged 24 hours, then discharged for the same amount of time).

The discharging curve has two plateaus: the first around 4 V corresponds to the reduction of manganese (III) to manganese (II) and the second, around 3.4 V, corresponds to the reduction of iron (III) to iron (II). The specific capacity obtained during discharge is 157 mAh.g$^{-1}$, which corresponds to 92% of the theoretical capacity.

The reduction is carried out in the presence of hydrogen (8% in argon).

The invention claimed is:

1. A material comprising particles, the particles comprising a core and a carbon deposit on the core, wherein the core comprises at least one compound of the formula $Li_xM_{1-y}M'_y(XO_4)_n$, wherein x, y and n are numbers such that $0 \leq x \leq 2$, $0 \leq y \leq 0.6$, and $1 \leq n \leq 1.5$, M is a transition metal or a mixture of transition metals from the first period of the periodic table, M' is an element with fixed valency selected from the group consisting of $Mg^{2+}$, $Ca^{2+}$, $Al^{3+}$, and $Zn^{2+}$, X is S, P or Si, and wherein the conductivity of the material is greater than $10^{-8}$ S.cm$^{-1}$, measured on a sample of powder compressed at a pressure greater than or equal to 3000 Kg.cm$^{-2}$.

2. The material according to claim 1, wherein the size of the core is between 0.05 micrometers and 15 micrometers.

3. The material according to claim 1, further comprising a cross-linking of carbon among the particles.

4. The material according to claim 2, further comprising a cross-linking of carbon among the particles.

5. A material comprising particles, the particles comprising a core, wherein the particles comprise a cross-linking of carbon among the particles, wherein the core comprises at least one compound of the formula $Li_xM_{1-y}M'_y(XO_4)_n$, wherein x, y and n are numbers such that $0 \leq x \leq 2$, $0 \leq y \leq 0.6$, and $1 \leq n \leq 1.5$, M is a transition metal or a mixture of transition metals from the first period of the periodic table, M' is an element with fixed valency selected from the group consisting of $Mg^{2+}$, $Ca^{2+}$, $Al^{3+}$, and $Zn^{2+}$, X is S, P or Si, and wherein the conductivity of the material is greater than $10^{-8}$ S.cm$^{-1}$, measured on a sample of powder compressed at a pressure greater than or equal to 3000 kg.cm$^{-2}$.

6. The material according to claim 5, wherein the size of the core is between 0.05 micrometers and 15 micrometers.

7. The material according to claim 1, wherein the total carbon amount of the material is between 0.1% and 25% of the total mass of the material.

8. The material according to claim 2, wherein the total carbon amount of the material is between 0 1% and 25% of the total mass of the material.

9. The material according to claim 4, wherein the total carbon amount of the material is between 0.1% and 25% of the total mass of the material.

10. The material according to claim 5, wherein the total carbon amount of the material is between 0.1% and 25% of the total mass of the material.

11. The material according to claim 6, wherein the total carbon amount of the material is between 0.1% and 25% of the total mass of the material.

12. An electrochemical cell comprising at least two electrodes and at least one electrolyte, wherein at least one of the electrodes comprises a material according to claim 1.

13. An electrochemical cell comprising at least two electrodes and at least one electrolyte, wherein at least one of the electrodes comprises a material according to claim 2.

14. An electrochemical cell comprising at least two electrodes and at least one electrolyte, wherein at least one of the electrodes comprises a material according to claim 8.

15. An electrochemical cell comprising at least two electrodes and at least one electrolyte, wherein at least one of the electrodes comprises a material according to claim 9.

16. An electrochemical cell comprising at least two electrodes and at least one electrolyte, wherein at least one of the electrodes comprises a material according to claim 5.

17. An electrochemical cell comprising at least two electrodes and at least one electrolyte, wherein at least one of the electrodes comprises a material according to claim 6.

18. An electrochemical cell comprising at least two electrodes and at least one electrolyte, wherein at least one of the electrodes comprises a material according to claim 10.

19. The electrochemical cell according to one of claims 12-18, wherein the at least one electrolyte is a solvating or non-solvating polymer.

20. The electrochemical cell according to claim 19, wherein the polymer is plasticized or gelled by a polar liquid containing one or more metallic salts in solution.

21. The electrochemical cell according to one of claims 12-18, wherein the at least one electrolyte is a polar liquid immobilized in a microporous separator and contains one or more metallic salts in solution.

22. The electrochemical cell according to claim 20, wherein at least one of the one or more metallic salts is a lithium salt.

23. The electrochemical cell according to claim 21, wherein at least one of the one or more metallic salts is a lithium salt.

24. The electrochemical cell according to one of claims 12-18, wherein at least one electrode is negative and comprises metallic lithium; a lithium alloy; a double nitride of lithium and iron, cobalt or manganese; or a lithium titanate of the formula $Li_xTi_{(5+3y)/4}O_4$, wherein $1 \leq x \leq (11-3y)/4$ or wherein $0 \leq y \leq 1$.

25. The electrochemical cell according to claim 24, wherein the lithium alloy is in a nanometric mixture with lithium oxide or a carbon insertion compound.

26. An electrochemical cell comprising at least two electrodes and at least one electrolyte,
wherein at least one electrode comprises at least one material comprising particles, the particles comprising a core and a carbon deposit on the core, the core containing at least one compound of the formula $Li_xM_{1-y}M'_y(XO_4)_n$, wherein x, y and n are numbers such that $0 \leq x \leq 2$, $0 \leq y \leq 0.6$, and $1 \leq n \leq 1.5$, M is a transition metal or a mixture of transition metals from the first period of the periodic table, M' is an element with fixed valency selected from the group consisting of $Mg^{2+}$, $Ca^{2+}$, $Al^{3+}$, and $Zn^{2+}$, X is S, P or Si, wherein the conductivity of the material is greater than $10^{-8}$ S.cm$^{-1}$, measured on a sample of powder compressed at a pressure greater than or equal to 3000 Kg.cm$^{-2}$, and
wherein at least one positive electrode comprises a material according to claim 1, wherein said material is alone or in mixture with a double oxide of cobalt and lithium; with an complex oxide of the formula $Li_xNi_{1-y-z-q-r}Co_yMg_zAl_rO_2$, wherein $0\ 05 \leq x \leq 1$, $0 \leq y$, z and $r \leq 0.3$; or with an complex oxide of the formula $Li_xMn_{1-y-z-q-r}Co_yMg_zAl_rO_{2-q}F_q$, wherein $0.05 \leq x \leq 1$ and $0 \leq y$, z, r, $q \leq 0.3$.

27. An electrochemical cell comprising at least two electrodes and at least one electrolyte,
wherein at least one electrode comprises at least one material comprising particles, the particles comprising a core and a carbon deposit on the core, the core containing at least one compound of the formula $Li_xM_{1-y}M'_y(XO_4)_n$, wherein x, y and n are numbers such that $0 \leq x \leq 2$, $0 \leq y \leq 0.6$, and $1 \leq n \leq 1.5$, M is a transition metal or a mixture of transition metals from the first period of the periodic table, M' is an element with fixed valency selected from the group consisting of $Mg^{2+}$, $Ca^{2+}$, $Al^{3+}$, and $Zn^{2+}$, X is S, P or Si, wherein the conductivity of the material is greater than $10^{-8}$ S.cm$^{-1}$, measured on a sample of powder compressed at a pressure greater than or equal to 3000 Kg.cm$^{-2}$, and wherein at least one positive electrode comprises a material according to claim 5, wherein said material is alone or in mixture with a double oxide of cobalt and lithium; with an complex oxide of the formula $Li_xNi_{1-y-z-q-r}Co_yMg_zAl_rO_2$, wherein $0.05 \leq x \leq 1$, $0 \leq y, z$ and $r \leq 0.3$; or with an complex oxide of the formula $Li_xMn_{1-y-z-q-r}Co_yMg_zAl_rO_{2-q}F_q$, wherein $0.05 \leq x \leq 1$ and $0 \leq y, z, r, q \leq 0.3$.

28. The electrochemical cell according to one of claims 12-18, 26 or 27, wherein the electrodes are bonded with a polymer wherein the polymer is a polyether, a polyester, a polymer based on methyl methacrylate units, an acrylonitrile-based polymer or a vinylidene fluoride, or a mixture thereof, or wherein the electrolyte is a polymer wherein the polymer is a polyether, a polyester, a polymer based on methyl methacrylate units, an acrylonitrile-based polymer or a vinylidene fluoride, or a mixture thereof.

29. The electrochemical cell according to one of claims 12-18, 26 or 27, further comprising a non-protogenic solvent selected from the group consisting of ethylene carbonate, propylene carbonate, an alkyl carbonate having 1 to 4 carbon atoms, γ-butyrolactone, a tetraslkylsulfamide, α-ω dialkylethers of a mono-, di-, tri-, tetra- and oligo-ethylene glycol with molecular weight less than or equal to 5000, and mixtures thereof.

30. A primary generator comprising an electrochemical cell according to one of claims 12-18, 26 or 27.

31. A secondary generator comprising an electrochemical cell according to one of claims 12-18, 26 or 27.

32. A supercapacitor comprising an electrochemical cell according to one of claims 12-18, wherein at the least one electrode of the electrochemical cell is a positive electrode and a second electrode is a negative electrode comprising carbon with a specific surface area greater than 50 m$^2$ g$^{-1}$ in the form of powder, fiber, or mesoporous composite of a carbon-carbon composite type.

33. A light modulation system comprising the electrochemical cell of one of claims 12-18, 26 or 27.

34. The light modulation system of claim 33, wherein said at least one electrode is an optically inactive counter-electrode comprising said material spread in a thin layer on a transparent conductor support of a glass or polymer type covered with doped tin oxide ($SnO_2$:Sb or $SnO_2$:F) or doped indium oxide ($In_2O_3$:Sn).

* * * * *